(12) United States Patent
Shapira et al.

(10) Patent No.: US 7,113,748 B2
(45) Date of Patent: Sep. 26, 2006

(54) SYSTEM AND METHOD FOR IMPROVING POLARIZATION MATCHING ON A CELLULAR COMMUNICATION FORWARD LINK

(75) Inventors: Joseph Shapira, Haifa (IL); David Levy, Carmiel (IL); Shmuel Miller, Tal-El (IL)

(73) Assignee: Celletra Ltd., Yokneam Ilit (IL)

( * ) Notice: Subject to any disclaimer, the term of this patent is extended or adjusted under 35 U.S.C. 154(b) by 581 days.

(21) Appl. No.: 10/275,390

(22) PCT Filed: May 4, 2001

(86) PCT No.: PCT/IB01/01028

§ 371 (c)(1),
(2), (4) Date: Feb. 27, 2003

(87) PCT Pub. No.: WO01/86823

PCT Pub. Date: Nov. 15, 2001

(65) Prior Publication Data

US 2003/0162566 A1    Aug. 28, 2003

Related U.S. Application Data

(60) Provisional application No. 60/268,700, filed on Feb. 15, 2001, provisional application No. 60/225,388, filed on Aug. 15, 2000, provisional application No. 60/202,197, filed on May 5, 2000.

(51) Int. Cl.
*H04B 1/00* (2006.01)

(52) U.S. Cl. .................. 455/63.4; 455/562.1; 455/121; 455/127.2; 342/362; 342/361; 370/18

(58) Field of Classification Search ............. 455/562.1, 455/121, 127.2, 183.2, 272, 63.4; 342/362, 342/361, 368; 370/18
See application file for complete search history.

(56) References Cited

U.S. PATENT DOCUMENTS

| | | | | |
|---|---|---|---|---|
| 5,533,011 A | * | 7/1996 | Dean et al. .................. | 370/342 |
| 5,757,318 A | * | 5/1998 | Reudink ...................... | 342/374 |
| 6,304,214 B1 | * | 10/2001 | Aiken et al. ................. | 342/362 |

FOREIGN PATENT DOCUMENTS

| WO | WO9839851 | 9/1998 |
|---|---|---|
| WO | WO9914870 | 3/1999 |
| WO | WO0156186 | 8/2001 |

* cited by examiner

*Primary Examiner*—Matthew Anderson
*Assistant Examiner*—Sanh Phu

(57) ABSTRACT

The present invention provides a method of controlling a plurality of beam patterns radiated by a base station in a wireless communication system. The method includes receiving at least one signal from a mobile station at the base station, determining estimated attributes of the at least one signal received by the base station. Smoothed versions of the estimated attributes are calculated in accordance with a predetermined set of criteria are calculated. A set of weighted signal parameters are generated to describe a polarization state of the at least one signal received from the mobile station. The generated weighed signal parameters are applied to a signal transmitted by the base station such that the transmitted signal substantially matches the polarization state of the at least one signal from the mobile station.

10 Claims, 35 Drawing Sheets

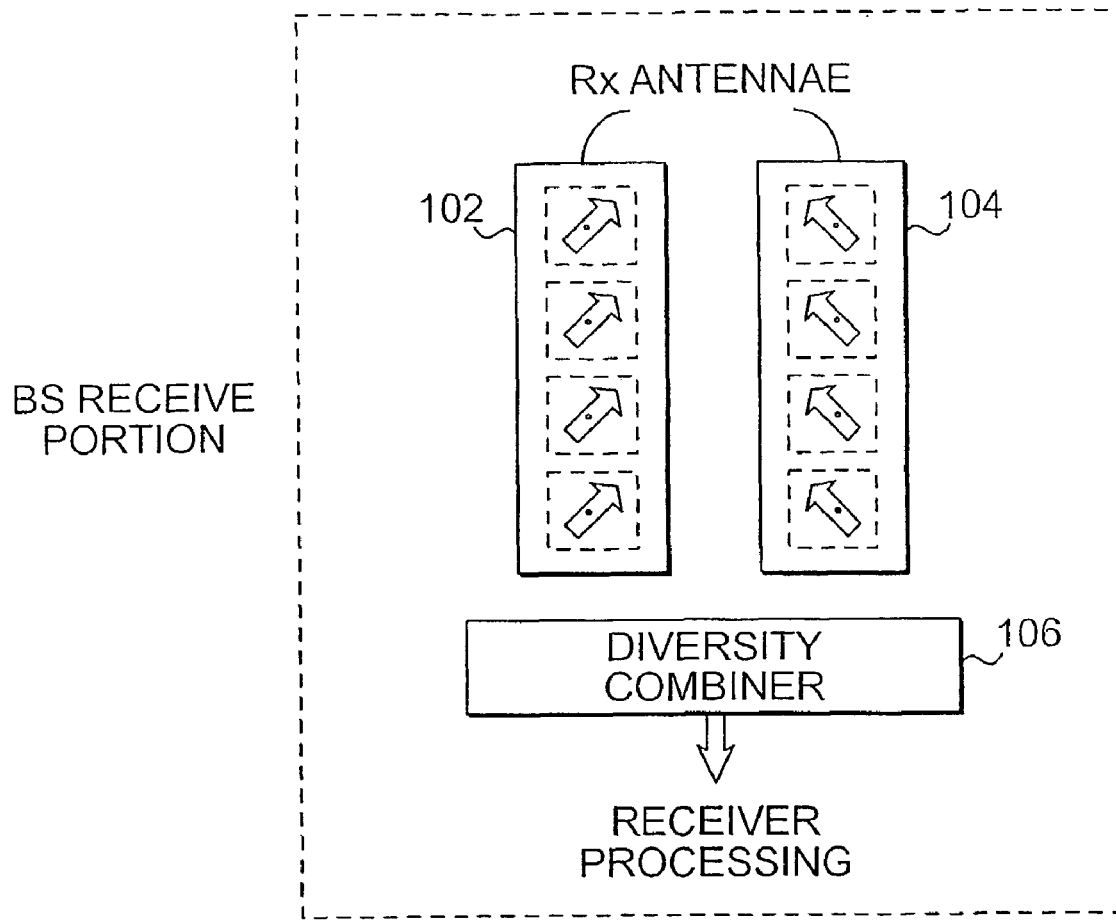
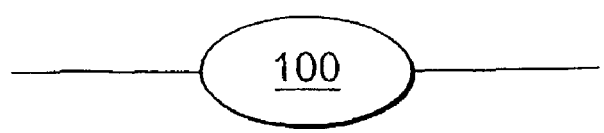
FIG. 1

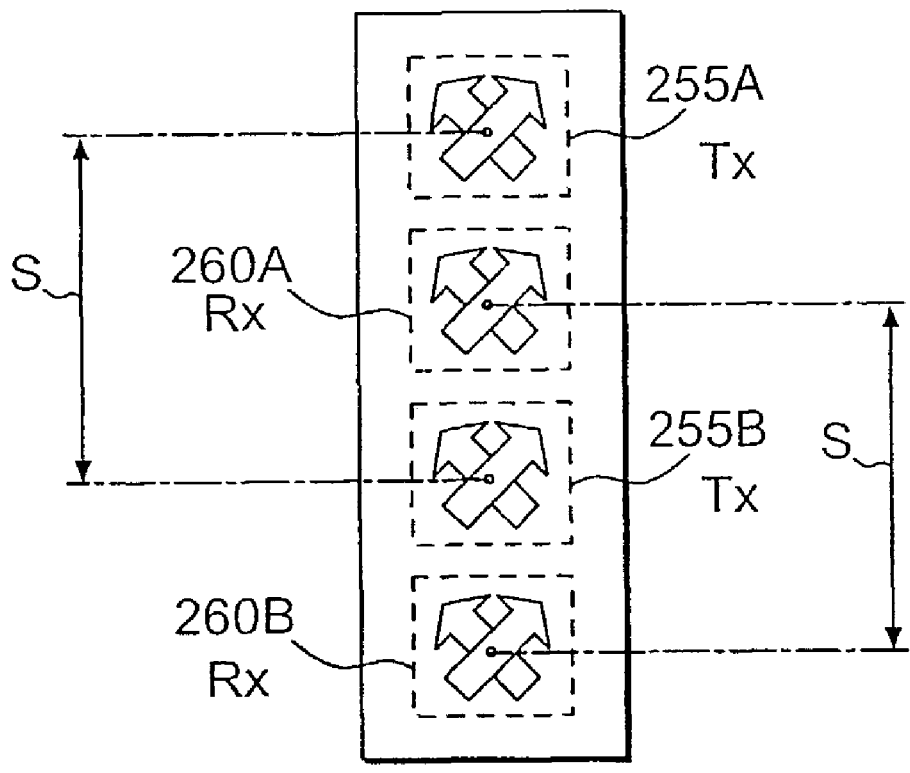
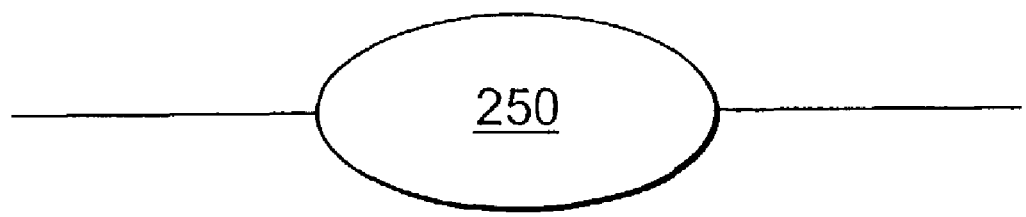
FIG. 2

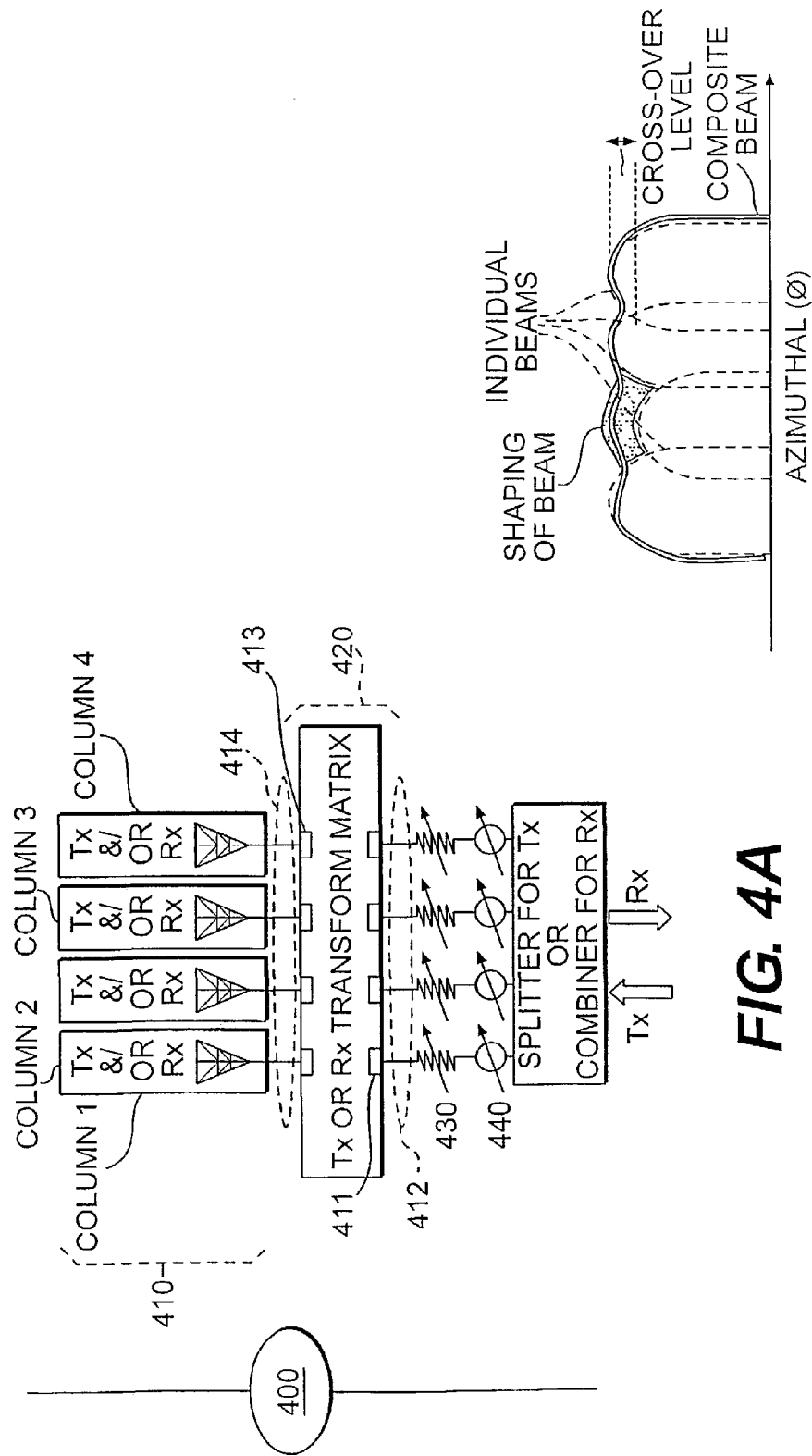

2400

SYSTEM AND METHOD FOR IMPROVING POLARIZATION MATCHING ON A CELLULAR COMMUNICATION FORWARD LINK

RELATED APPLICATION DATA

The present application is related to the disclosures provided in U.S. Provisional application No. 60/202,197 entitled SYSTEM AND METHOD FOR PROVIDING POLARIZATION MATCHING ON A CELLULAR COMMUNICATION FORWARD LINK filed May 5, 2000; U.S. Provisional application No. 60/225,388 entitled SYSTEM AND METHOD FOR IMPLEMENTING POLARIZATION MATCHING ON A CELLULAR COMMUNICATION FORWARD LINK filed Aug. 15, 2000; and U.S. Provisional application No. 60/268,700 entitled "SYSTEM AND METHOD FOR IMPLEMENTING POLARIZATION MATCHING FOR CELLULAR COMMUNICATIONS SYSTEMS HAVING MULTIPLE ANTENNA ELEMENTS" filed on Feb. 15, 2001. The contents of these applications are hereby expressly incorporated by reference in their entireties.

BACKGROUND

This application is the National Phase of International Application PCT/IB01/01028 filed May 4, 2001 which designated the U.S.

RESERVATION OF COPYRIGHT

The disclosure of this patent document contains material which is subject to copyright protection. The copyright owner has no objection to the facsimile reproduction by anyone of the patent document or the patent disclosure, but otherwise reserves all copyrights whatsoever.

FIELD OF THE INVENTION

This present invention, in certain respects, relates to the field of cellular communications. In other respects, the present invention relates to polarization matching: on forward link transmissions of a cellular communication system and methods to implement the polarization matching for a cellular communication system.

DESCRIPTION OF BACKGROUND INFORMATION

Today's cellular communication systems are subjected to ever-increasing user demands. Current subscribers are demanding more services and better quality while system capacities are being pushed to their limits. In striving to achieve higher capacities and better grades of service, it becomes necessary to optimize transmission integrity by decreasing transmission losses wherever possible.

Typically, for each geographic cell, cellular communication systems employ a base station (BS) with an omni-directional antenna that provides signal coverage throughout the cell. An alternative approach angularly divides the geographic cells into sectors (i.e., sectoring) and deploys BS antennae that radiate highly-directive narrow beam patterns to cover designated sectors. The directive beam patterns can be narrow in both the azimuthal and elevation plane and, by virtue of their directional gain, enable mobile stations (MSs) to communicate with the BS at longer distances.

The narrow beams used to form beam patterns for given coverage areas are optimized to improve performance of the wireless network. Optimization may include the polarization of the beams to enhance performance. Traditionally, BSs employ a plurality of vertically-polarized antennae, which complement the vertically-polarized antennae of most mounted MSs (e.g., non-handheld MSs). This configuration, however, is insufficient in accommodating signals from hand-held MSs, as well as cars with non-vertical antennas.

Generally, hand-held MSs have transmit antennae that are linearly polarized. The polarization is randomly distributed depending upon the position in which the MS is held. For example, the polarization of hand-held MS antenna may vary up to 20° degrees from the horizontal to the vertical plane relative to the BS antennae. Thus, there exists an polarization mismatch between hand-held MSs and BS antennae. Such a polarization mismatch can cause an average transmission loss of up to 7 dB and instantaneous transmission losses of up to 9 dB.

In an effort to overcome such costly transmission losses, some BSs incorporate multiple polarization-diverse antennae with combiner circuitry to "match" the polarization of the MS-to-BS transmissions (i.e., reverse link transmissions). For example, FIG. 1 illustrates a receive portion of a BS antenna system 100 employing polarization-diverse receive antenna elements 102, 104. The receive elements 102, 104 are configured to accommodate two opposing (i.e., orthogonal) linearly-slanted polarized states (i.e., ±45° linear polarization). The signals received by both types of antenna elements 102, 104 are applied to a diversity combining circuit 106, which determines a maximum value in a preferred signal parameter (e.g., signal-to-noise ratio, SNR) between the two signals received from antenna elements 102, 104. In this manner, the BS is able to limit transmission losses due to polarization mismatches by matching the reverse link transmission to one of two possible polarization states (i.e., ±45°).

Because hand-held MSs are not generally equipped with multiple antennae, such polarization matching schemes cannot be implemented in MSs to compensate for polarization mismatches during BS-to-MS transmissions (i.e., forward link transmissions). This results in costly transmission losses in the forward link. What is needed, therefore, is effective polarization matching on forward link transmissions to mitigate transmission losses due to the polarization mismatch between hand-held MSs and BSs.

BRIEF DESCRIPTION OF THE DRAWINGS

The above and other objects, features and advantages of the present invention are further described in the detailed description which follows, with reference to the drawings by way of non-limiting exemplary embodiments of the present invention, wherein like reference numerals represent similar parts of the present invention throughout the several views and wherein:

FIG. 1 is a high level diagram depicting a first type of antenna arrangement;

FIG. 2B depicts different antenna polarization arrangement units;

FIG. 4A is a high level diagram illustrating a BS antenna system capable of shaping composite beams;

FIG. 4B is a diagram of a composite beam;

DETAILED DESCRIPTION

Figure 3B:
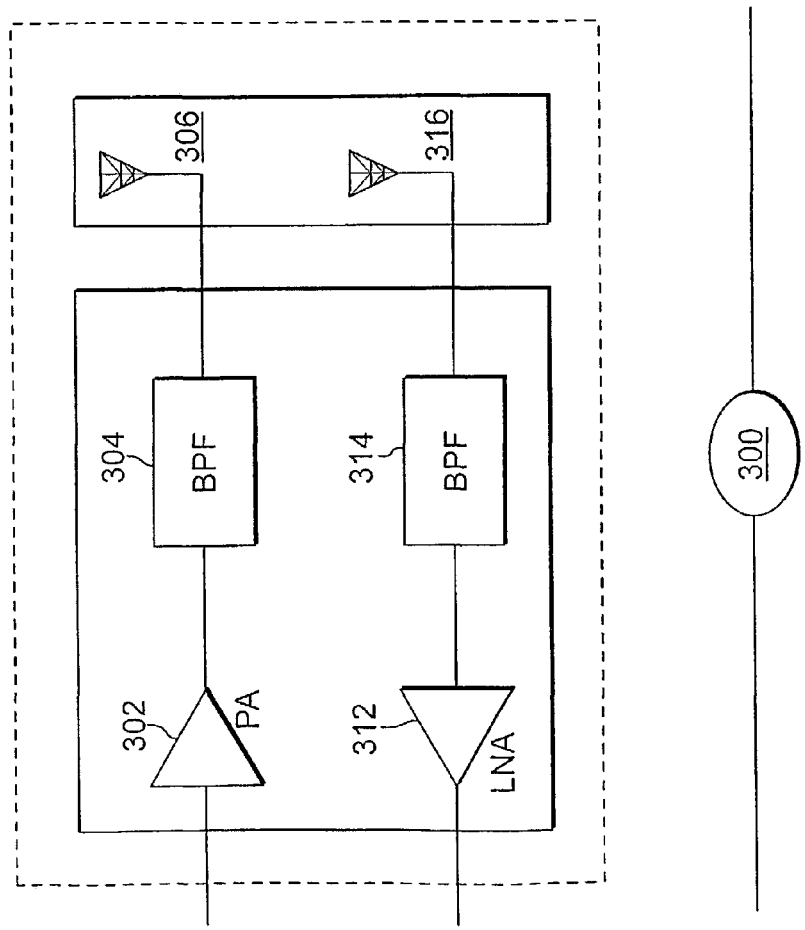
FIG. 3B depicts another antenna arrangement.

The present invention, for example, utilizes the information measured and processed on the receive (Rx) polarization to estimate the average required transmit (Tx) polarization. The average polarization state of the waves is not frequency dependent, and can be inferred from the reverse link, in order to determine weights in the forward link transmission. The Polarization matching method for Base Tranceiver System (BTS) forward link transmission management improves the power value and efficiency along with reduced interference. Additional important benefits stem from the improved soft handoff (SHO) zone performance.

FIG. 2 illustrates a representative embodiment of an active antenna array configuration for a BS, which is described in "ACTIVE ANTENNA ARRAY CONFIGURATION AND CONTROL FOR CELLULAR COMMUNICATION SYSTEMS," appln Ser. No. 09/357,844 filed on Jul. 21, 1999. As depicted in FIG. 2, antenna array 250 comprises a combination of two active transmit antenna elements 255A, 255B and two active receive antenna elements 260A, 260B arranged in a single vertical (columnar) array. The two active transmit antenna elements 255A, 255B and two active receive antenna elements 260A, 260B are preferably printed elemental radiators having a multi-layer configuration and sealed by an epoxy-fiberglass radome.

By incorporating separate transmit antenna elements 255A, 255B and receive antenna elements 260A, 260B within a single array, the BS is capable of achieving full transmission and reception functionality for cellular operations while eliminating the need for independent transmission and reception antenna arrays. In doing so, antenna array 250 achieves full BS functionality in a streamlined and compact design.

The spatial separation of the transmit 255A, 255B and receive antenna elements 260A, 260B within the array also avoids the intermodulation interference on the receive portion caused by the high power transmit signals, as stated above with respect to conventional combined-element systems. The spatial separation also provides flexibility in BS transmission and reception optimization schemes, such as, for example, independent gain control and beam-shaping, which is limited in combined-element systems. In addition, the separation also obviates the need for signal discriminating hardware, such as duplexers and complex transmit and receive filters which, in attempting to isolate and filter the respective signals from combined transmit/receive antenna elements, operate in a relatively lossy and inefficient manner. Such spatial separation also results in additional isolation between the receive and transmit signals.

FIG. 2 further illustrates that, within the vertical arrangement, the antenna elements are disposed in an alternating fashion such that a first transmit antenna element 255A is followed by a first receive antenna element 260A and a second transmit antenna element 255B is followed by a second receive antenna element 260B. The interleaving of the transmit 255A, 255B and receive 260A, 260B antenna elements within the array enables the optimal vertical separation distance S to be established. Optimal vertical separation distance S is the vertical distance between like antenna elements which, for a given frequency, maximizes the main lobe gain of a signal while minimizing the contribution of minor lobes. The optimal vertical separation distance S can vary. For example, in a personal communication system (PCS), S may be from $0.70\lambda$ to $0.95\lambda$.

Additionally, the transmit 255A, 255B and receive 260A, 260B antenna elements within the array antenna are configured to produce polarized radiated patterns. Polarization of a radiated pattern in a specified direction results in the maximum gain of the pattern along the specified direction.

Because of multipath considerations, coupled with the relatively low transmit power of MSs, antenna array 250 provides the additional benefit that it is configured to provide polarization diversity for both the BS transmit antenna elements 255A, 255B and the BS receive antenna elements 260A, 260B. Specifically, each of transmit antenna elements 255A, 255B and receive antenna elements 260A, 260B comprise a pair of orthogonally polarized antenna elements. Polarization diversity typically requires two antenna elements that are orthogonally polarized. The effectiveness of polarization diversity depends on the similarity of the radiated patterns transmitted or received by the two antenna elements and on the equality of the average signal level transmitted or received by the elements. For example, as stated above, hand-held MSs possess antennae that are linearly polarized with a random distribution depending upon the position in which the MS is held. As such, antenna array 250 exploits these polarization states by configuring each of the BS transmit antenna elements 255A, 255B and each of the receive antenna elements 260A, 260B to accommodate two opposing (i.e., orthogonal) linearly-slanted polarized states (i.e., ±45° linear polarization).

It is to be understood that the specific arrangement of antenna array 250 may be modified to provide redundancy or otherwise enhance the attributes and characteristics of the array configuration. For example, antenna array 250 may be augmented by stacking combinations of the array to achieve antenna elements arranged in an 8×1, 12×1, or 16×1 array configuration. This arrangement, therefore, provides a compact single-column array antenna configuration for cellular communications having full transmission and reception capabilities. Further, the arrangement enables independent transmit and receive gain control and beam-shaping, minimizes transmit intermodulation interference, and provides both transmit and receive polarization diversity.

Figure 3A:
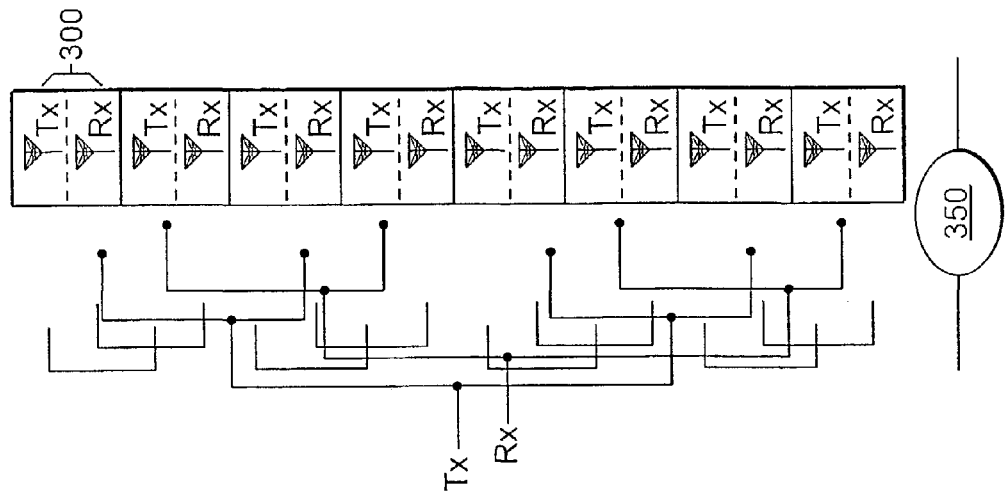
FIG. 3A depicts an active radiator unit.

FIG. 3A depicts a representative embodiment of an Active Radiating Unit (ARU) 300, which is described in the commonly-assigned application entitled "SCALABLE CELLULAR COMMUNICATIONS SYSTEM," appln Ser. No. 09/357,844 filed on Jul. 21, 1999. The ARU 300 comprises a modular antenna unit having a transmit path and a receive path. The transmit path incorporates a power amplifier (PA) 302, which is electrically coupled to a transmit band-pass filter 304. The transmit filter 304 is, in turn, electrically coupled to a transmit antenna 306. The transmit antenna 306 may be configured for a variety of operations, including, for example, vertical or dual slanted-linear polarization, as indicated above in antenna arrays 100, 250. Similarly, the receive path implements a receive antenna 316, which is electrically coupled to a receive bandpass filter 314. The receive antenna 316 may also be configured for a variety of operations, including, for example, vertical or dual slanted-linear polarization, as indicated above in antenna arrays 100, 250. The receive bandpass filter 314 is subsequently coupled to a low-noise amplifier (LNA) 312. The ARU 300 may also include monitoring and control sub-units as well as power conditioning sub-units in order to provide supervisory control, management functionality, and optimal performance. As such, the ARU 300 provides transmission and reception path portions within a single modular unit.

FIG. 3B illustrates antenna array 350, deploying a plurality of ARUs 300 in an 8×1 (columnar) arrangement. Inputs to the array 350 are facilitated by two corporate feeds, which respectively interconnect all the transmit antenna elements and all the receive antenna elements. As stated above with respect to ARU 300, the transmit elements may be vertically polarized and the receive antenna elements may be linearly-slant polarized (i.e., ±45° linear polarization). Alternatively, antenna array 350 may be configured to have transmit and receive polarization diversity by configuring both the transmit antenna elements and the receive antenna elements to have linearly-slant polarization.

FIG. 4A depicts a representative embodiment of a BS antenna system 400 comprising a multi-columnar antenna arrangement 410 coupled to a transform matrix 420, as described in the commonly-assigned application entitled "ACTIVE ANTENNA ARRAY CONFIGURATION AND CONTROL FOR CELLULAR COMMUNICATION SYSTEMS," filed on Jul. 21, 1999. As illustrated in FIG. 4A, the antenna arrangement 410 and the transform matrix 420 are configured for either transmit or receive BS operations. The transform matrix 420 comprises a plurality of beam ports 411 on a beam-plane side 412 of the matrix 420 and a plurality of antenna ports 413 on the antenna-plane side 414 of the matrix 420. Each column array (column 1, 2, 3, and 4) of the multi-columnar array arrangement 410 is coupled to the matrix 420 through the antenna ports 413. During BS system 400 transmission, this configuration enables the transform matrix 420 to receive signals, which include relative amplitude and phase information, from the beam-plane side 412. Based on this information, the matrix 420 transforms the beam-plane signals into signals appropriate for the radiating antenna elements (column 1, 2, 3, and 4) and delivers such signals to all the antenna ports 413. The antenna elements (column 1, 2, 3, and 4) within the columns of multi-column array 410, then radiate narrow shaped beam patterns in different directions in accordance with the transformed signals. Conversely, during BS system 400 reception, the transform matrix 420 receives signals from the antenna-plane 414 ports 413 and transforms them into signals appropriate for processing. As such, the illustrated system 400 forms a plurality of narrow beam patterns that span different angular directions for a given axis.

FIG. 4A further illustrates that each of the beam ports 411 on the beam-plane side 412 of the transform matrix 420 is coupled to an amplitude or gain adjusting element 430 and a phase adjusting element 440. Elements 430, 440 allow for amplitude/gain and phase adjustments to be made in order to control the shape of the antenna beam patterns, as indicated in FIG. 4B.

FIG. 4B illustrates a typical composite beam pattern radiated by a BS system, such as BS antenna system 400 depicted in FIG. 4A. The transform matrix 420 supplies signals to the antenna ports 413, which enables the antenna elements (column 1, 2, 3, and 4) to form four individual beams. The aggregate effect of these individual beams is the envelope composite beam, as indicated in FIG. 4B. As stated above, amplitude/gain adjusting elements 430 and phase adjusting elements 440 make it possible to control the shape of the antenna beam patterns. The amplitude level at which the individual beams (i.e., sub-beams) intersect is called the cross-over level. The position of the cross-over level depends, at least in part, on the optimal separation distance of the antenna elements contained in the antenna array 410.

Figure 5A:
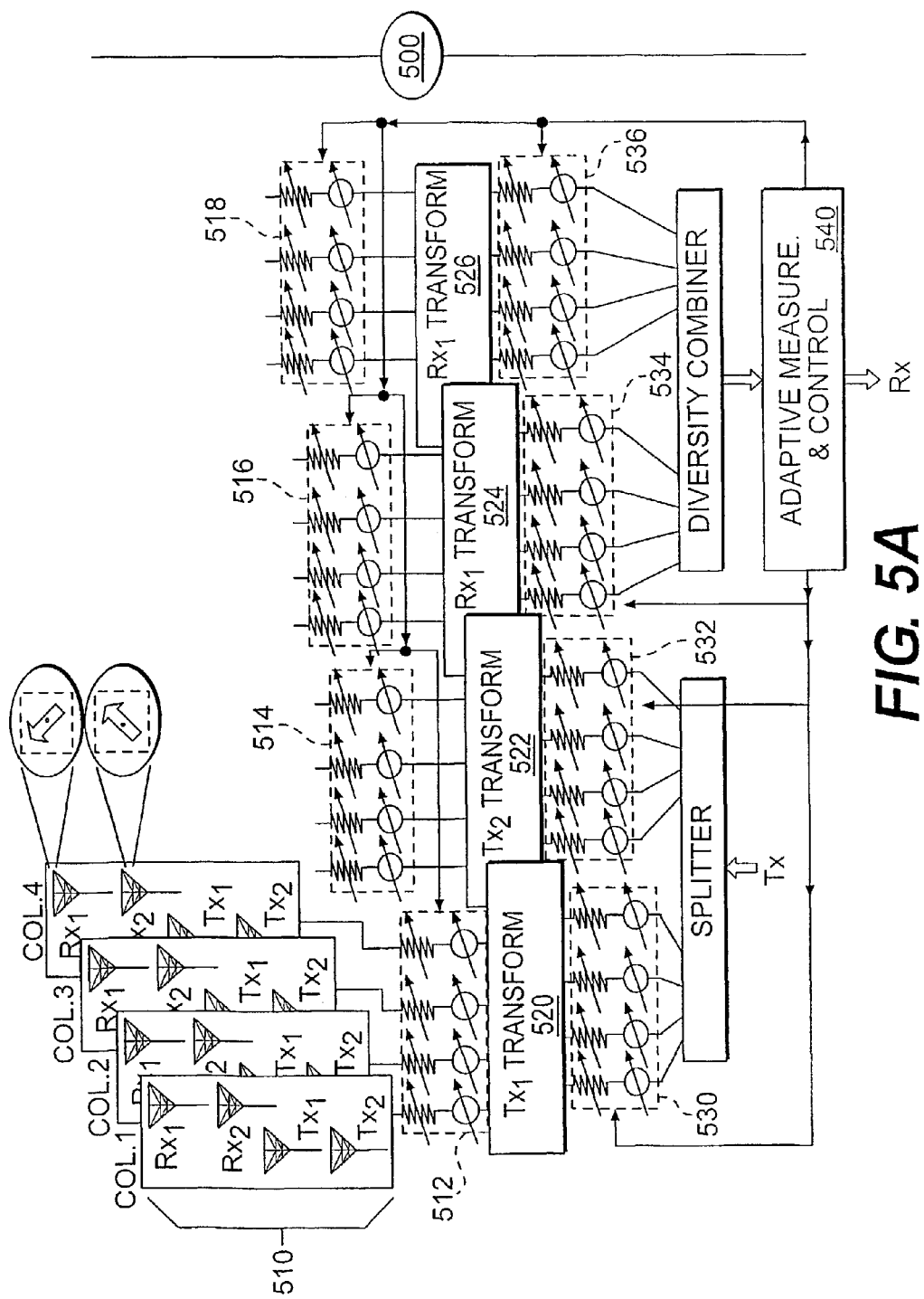
FIGS. 5A, 5B, 5C, 5D are high level diagrams illustrating embodiments of the present invention.

FIG. 5A illustrates an embodiment of the present invention, incorporating some of the features noted above to provide polarization matching on a forward link transmission of a cellular communication system. In particular, FIG. 5A depicts a BS antenna system 500 comprising a multi-columnar antenna arrangement 510 coupled to transmit transform matrices 520, 522 and receive transform matrices 524, 526, respectively. The multi-columnar antenna arrangement 510 includes one or more transmit-receive antenna sets; each set includes two transmit antenna elements and two receive antenna elements. The illustrated arrangement is used to achieve polarization matching on both, the transmit and receive portion of the system 500. For example, as indicated in FIG. 5A both transmit and receive antenna elements comprise two opposing (i.e., orthogonal) linearly-slanted polarized states (i.e., ±45° linear polarization). It is to be noted that other antenna arrangements along with different polarization orientations may be provided in order to achieve diversity on the transmit and receive portions. For example, FIG. 5A may be altered to illustrate an embodiment of a single column, without transform matrices, and with weights 530, 532, 534, 536 comprising a single amplitude/gain and phase adjusters, such as attenuator and phase shifters, and further comprising a diversity combiner and a splitter.

Each of the transmit and receive antenna elements within the columns of the array arrangement 510 are associated with the antenna ports corresponding to the respective transmit 520, 522 and receive 524, 526 matrices. The antenna ports are coupled to a host of amplitude/gain and phase adjustments 512, 514, 516, 518. Conversely, the beam ports of the transmit 520, 522 and receive 524, 526 matrices are coupled to a separate host of amplitude/gain and phase adjustments 530, 532, 534, 536. As such, the polarization of each radiated beam pattern can be controlled separately. Alternatively, the configuration may omit the amplitude/gain and phase adjustments, and thus not control the polarization of the radiated beam patterns.

FIG. 5A further illustrates an adaptive measurement and control portion 540 coupled to antenna port amplitude/gain and phase adjustments 512, 514, 516, 518 and to beam ports 530, 532, 534 and 536. The adaptive measurement and control portion 540 may be provided with a "fast" mechanism for quickly adapting to fading signals on the received reverse link by adjusting the receive amplitude/gain and the phase adjustments 516, 518 at the antenna plane. The adaptive measurement and control portion 540 further comprises a "slow" mechanism that follows the physical movements of a particular MS and averages the fading of the received reverse link. As indicated in FIG. 5A, adaptive measurement and control portion 540 is also applied to amplitude/gain and phase adjustments 512, 514 on the transmit portion of system 500 to vary the polarization on the forward link in an effort to match the short-term average polarization of the MS.

Figure 5B:
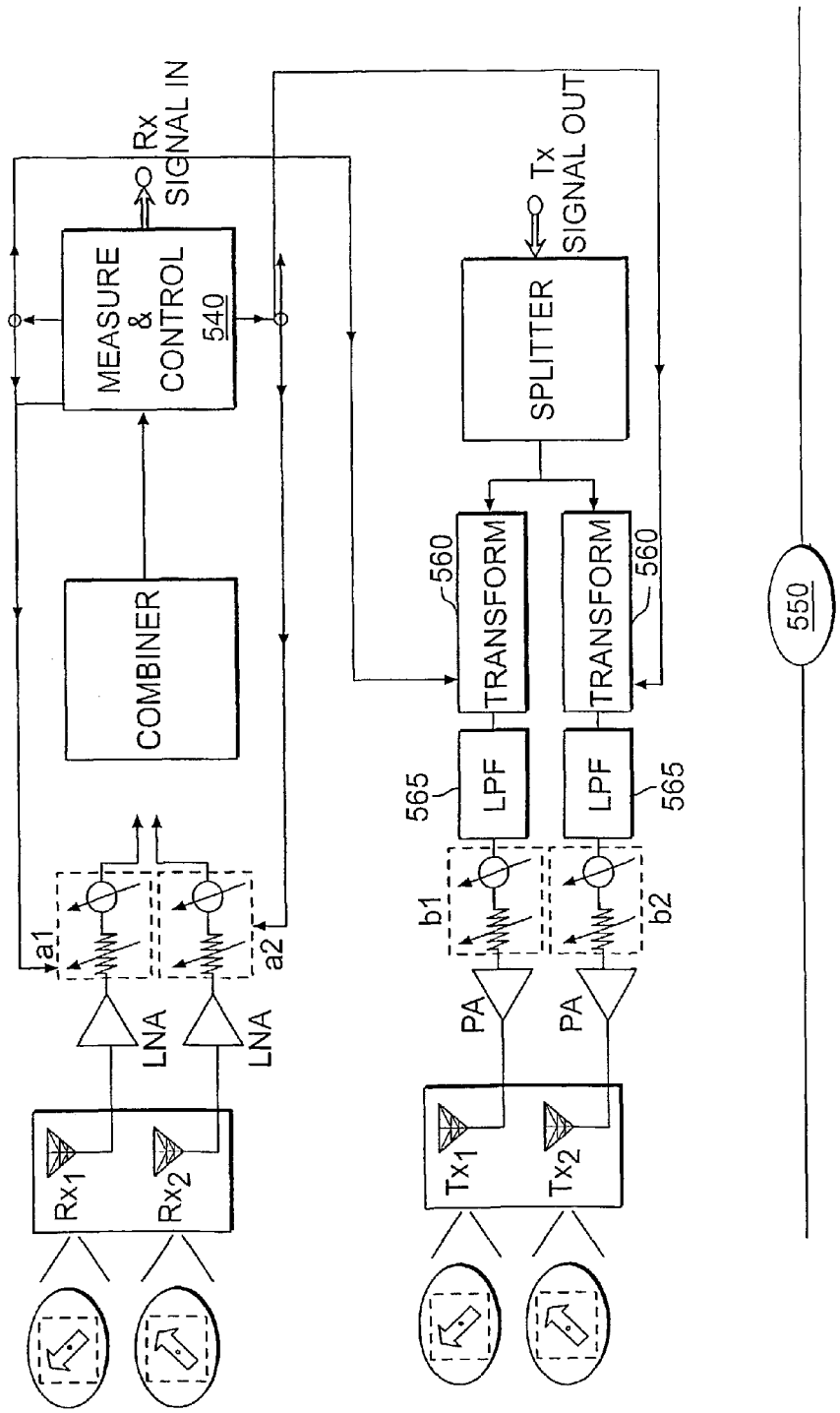

Specifically, as depicted in system 550 of FIG. 5B, the signal detected from the MS on each of the receive antenna elements 507 is amplitude/gain adjusted and/or phase adjusted by amounts a1 and a2, which may be equal to each other. The adjusted signal for each of the receive antenna elements is combined and adaptively controlled by the measurement and control portion 540, which drives the values of a1 and a2. This diversity combining may be applied at baseband, which requires two full receiver chains, at RF, or at IF.

The amplitude/gain adjustments and/or phase adjustments driven by measurement and control portion 540 are subsequently supplied to transform 560. The transform 560 first transforms amplitude/gain adjustments and/or phase adjustments in accordance with the differences in gain of the transmitting antenna elements. A low-pass filter portion 565, coupled to transform 560, then averages the fast control variations and responds only to the slow variations resulting from the physical attitude changes of the MS. The output of low-pass filter portion 565 generates transmit amplitude/gain adjustments and/or phase adjustments b1 and b2, which are applied to each MS at baseband.

It is to be understood that for single RF transmissions (e.g., single RF TDMA channel), the transmission may be adjusted in the RF side of the BS or by controlling the associated amplifiers in the chain (see, for example, FIG. 3A). It is also understood that for multi-channel transmissions, the signal may be split into two branches, adjusted for polarization matching, and combined with the associated transmission chain.

Thus, this embodiment utilizes information driven by the received return link signals to ensure that the transmitted signal polarization matches the polarization of the incoming signal. In doing so, forward link operation is enhanced and transmission losses due to polarization mismatches are significantly reduced.

Figure 5C:
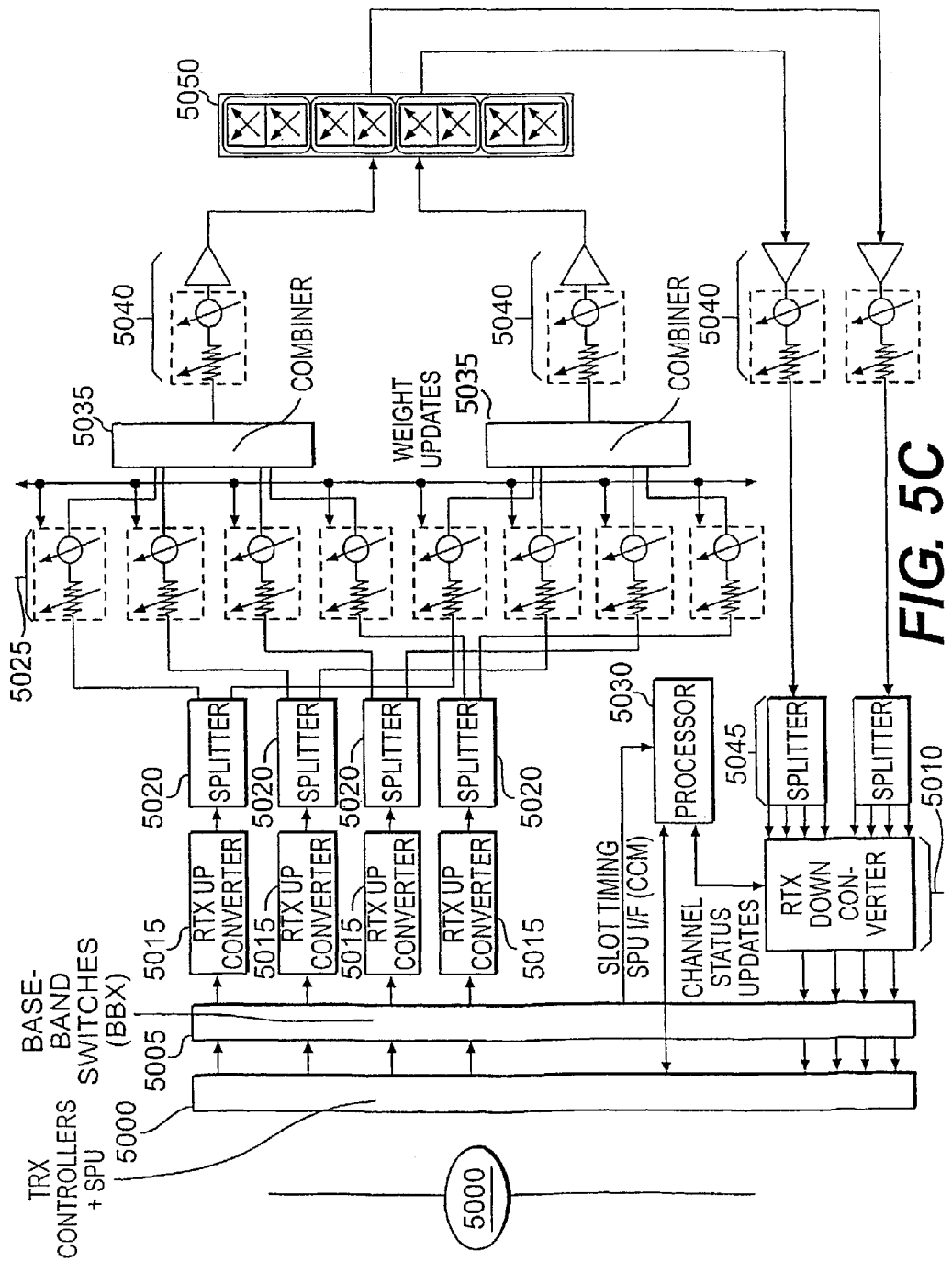

The base station antenna may be adapted to be used with various communications technologies, such as GSM and CDMA. To illustrate, FIG. 5C is another embodiment of the present invention, incorporating some of the features noted above to provide polarization matching on a forward link transmission of a cellular communication system, such as GSM. In particular, this embodiment adjusts the amplitude/gain and/or phase of the forward link transmission based on the polarization of the reverse link transmission. This embodiment is applied per MS user (i.e., time-slot), and per carrier, which may be applied at baseband, IF, or RF. This exemplary embodiment relates to RF.

In particular, FIG. 5C depicts a BS antenna system 5000 comprising a multi-columnar antenna arrangement 5050. The output power of the antenna arrangement 5050 is split into two orthogonal polarizations, such as, for example, opposite linearly-slanted polarized antenna elements (i.e., ±45° linear polarizations). The power is transmitted according to the originally received polarization. The illustrated arrangement is used to achieve polarization matching on both the transmit and receive portion of the system 5000. Other antenna arrangements along with different polarization orientations may also be provided.

The signals from the receive portion of the antenna arrangement 5050 are routed to amplitude/gain adjustments and/or phase adjustments 5040, which may be used to control the carriers. The receive amplitude/gain adjustments and/or phase adjustments 5040 are electrically coupled with splitters 5045, which replicate their input signal. For instance, in FIG. 5C, each of the splitters 5045 replicates the input signal four times, and thus outputs four similar signals. These output signals are transmitted to transmit and receive controller 5000 via down converter 5010 and switches 5005.

A processing unit may comprise splitters 5020, amplitude/gain adjustments and/or phase adjustments 5025, combiners 5035, and processor 5030. The splitters 5020 receive signals, as input, that are transferred from the controller 5000 via the switches 5005 and up converters 5015. The splitters 5020 replicate their input signals twice, and thus each of the splitters 5020 output two similar signals. These output signals are weighted with the amplitude/gain adjustments and/or phase adjustments 5025. The processor 5030 determines the weights (per user per carrier) based, in part, on input parameters, such as channel status, diversity, equalizer, dominant coefficients, relative levels, and maximal ratio combining complex coefficients. That is, the down-converter 5010 demodulates each of the (4) received carrier pairs (received each via two orthogonally polarized antennas. The down converter 5010 also optimally combines each carrier pair obtaining Rx diversity. This is repeated sequentially per time slot. Thus, each pair of received signals results in one output of baseband information, per carrier. Furthermore, the down converter 5010 performs equalizer functions. As such, down converter 5010 estimates channel parameters. The channel parameters are then passed to the processor 5030, which processes the information, per user, to estimate channel dynamics. Also, the receiver optimal combining weights are conveyed to the processor 5030. The processor 5030 then filters the information to produce the Transmit polarization matching weights, which configure the amplitude/gain adjustments and/or phase adjustments 5025.

Combiners 5035 then sum up the weighted carriers in order for the carriers (i.e., RF signals) to be amplified for each orthogonal polarized antenna. Thus, the output of the combiners 5035 resembles the form of one of the following equations:

$$RF_1 = \Sigma(a_k)(RF_k); \text{ or } RF_2 = \Sigma(b_k)(RF_k),$$

wherein a and b are the weights, and $RF_K$ are the outputs of up converters 5015. It should be noted that processor 5030 applies the weights $a_k$ and $b_k$ at the mid-point of time frame slots. The processor 5030 receives timing information from the parameters, as noted above, to determine the time frame slots, and the mid-point of the time frame slots. In particular, it may be assumed that the slot timing is the mid-point between slots, or that clocked timing logic circuitry calculates the time-shift needed to determine the mid-point, and produces a mid-point-pulse. The timing requirements may be standard specific, such as for GSM.

The outputs of the combiners 5035 are then transferred to transmit amplitude/gain adjustments and/or phase adjustments 5040. Finally, the outputs of the transmit amplitude/gain adjustments and/or phase adjustments 5040 are transferred to the cross-polarized antenna arrangement 5050. The output transmission, however, may need to be ramped-up or ramped-down because of the weights, which vary according to the MS users. This ramping may be applied using the amplification/gain and phase adjustments 5025, and allows for smoothed transitions between states rather than abrupt switching.

Thus, this embodiment utilizes information driven by the received return link signals to ensure that the transmitted signal polarization matches the polarization of the incoming signal. In doing so, forward link operation is enhanced and transmission losses due to polarization mismatches are significantly reduced.

Figure 5D:
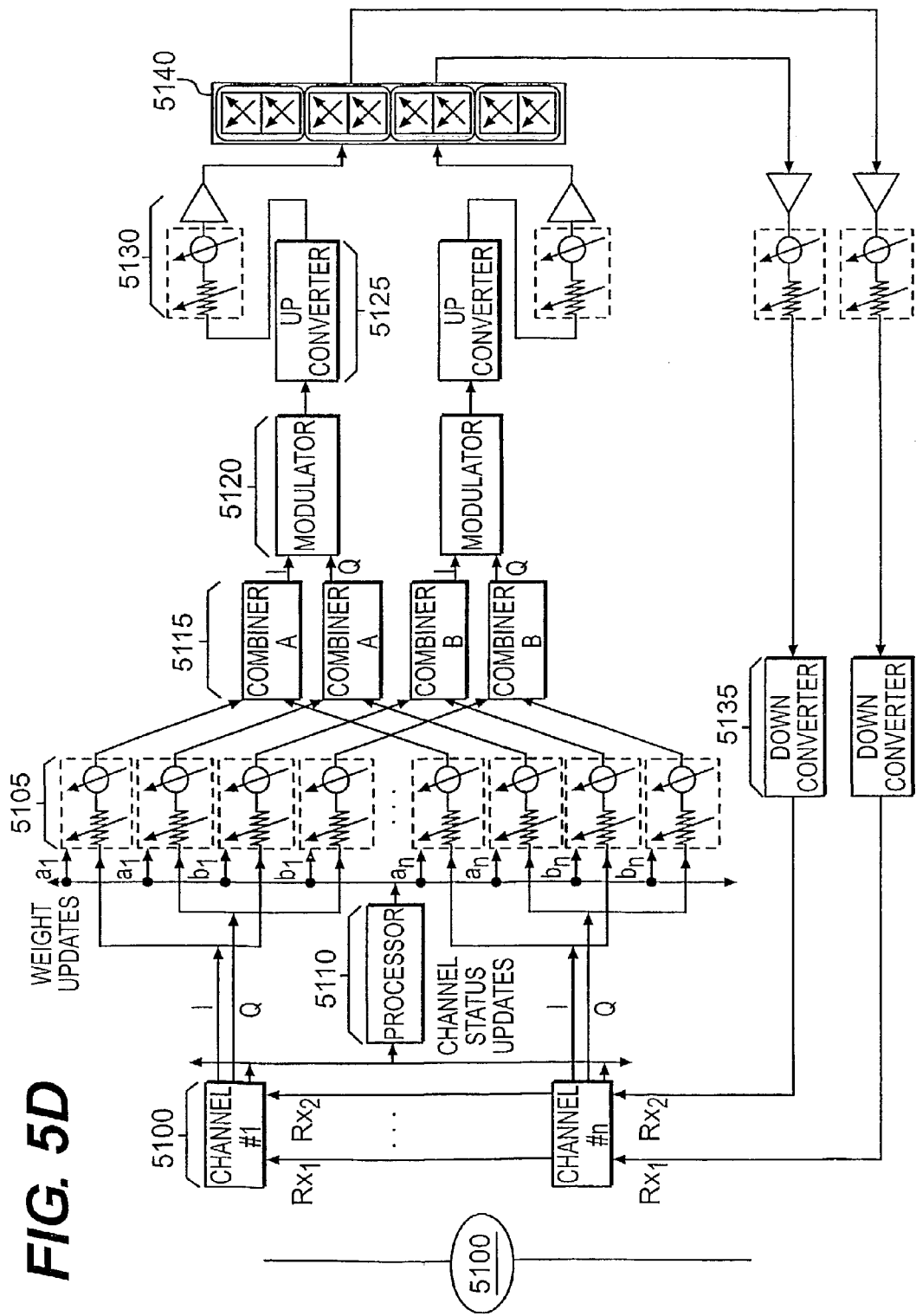

FIG. 5D is another embodiment of the present invention, incorporating some of the features noted above to provide polarization matching on a forward link transmission of a cellular communication system, such as CDMA. In particular, this embodiment adjusts the amplitude/gain and/or phase of the forward link transmission based on the polarization of the reverse link transmission. This embodiment is applied per MS user (i.e., CDMA channel element) in baseband. That is, CDMA transmissions are overlapping in the frequency domain (even for a single carrier). The separate user coded transmissions are generated in baseband, then summed and the aggregate is up-converted and transmitted in RF. Thus, operation in RF affects all users, and cannot be realized on a per-user basis. The per-user operation may be applied prior to the summation point, i.e., at baseband.

In a TDMA system (i.e., GSM) the application in RF is possible for single carrier transmissions, since the optimal polarization matching is performed sequentially per user in consecutive time-slots. With two or more GSM carriers, then the sequential RF polarization matching may be done prior to the RF summation node of the single carriers.

Figure 18:
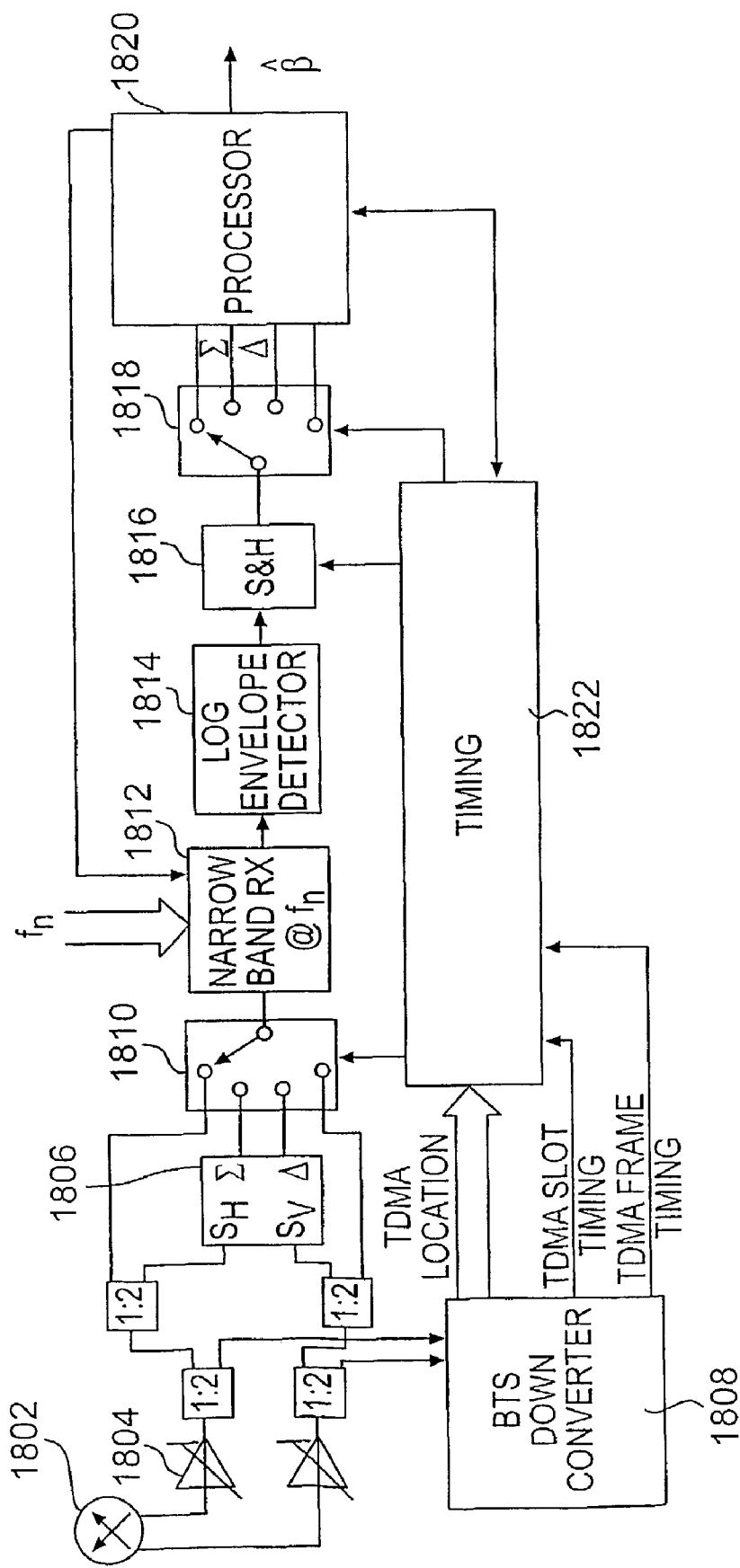
FIG. 18 is a high level diagram depicting an embodiment of a TDMA system (single carrier)

FIG. 18 depicts an embodiment of a single carrier as used with a TDMA system, such as GSM or IS-54. The system may receive the timing information per user (i.e., location of the TDMA time slot within the TDMA frame). A narrow band tuned receiver, which is used as a logarithmic detector, provides the signals measurements. The processor controls the switch timing and computes the polarization vector (sign—magnitude) estimate based, in part, on $\Sigma-\Delta$ and RF signal level measurements.

FIG. 5D depicts a BS antenna system 5100 comprising a multi-columnar antenna arrangement 5140. The output power of the antenna arrangement 5140 is split into two orthogonal polarizations, such as, for example, opposite linearly-slanted polarized antenna elements (i.e., ±45° linear polarizations). The power is transmitted according to the originally received polarization. The illustrated arrangement is used to achieve polarization matching on both the transmit and receive portions of the system 5100. Other antenna arrangements along with different polarization orientations may also be provided.

The signals from the receive portion of the antenna arrangement 5140 are routed to amplitude/gain adjustments and/or phase adjustments 5130, which may be used to control the carriers. The receive amplitude/gain adjustments and/or phase adjustments 5130 are electrically coupled with down converters 5135 that are electrically coupled with CDMA channel elements 5100. In this embodiment, the number of users comprise "n." The channel elements 5100 output modulated I and Q components per user. That is, the channel elements 5100 are MODEMs (one per user transmissions) that both transmit and receive. RAKE receivers within the channel elements 5100 comprise channel state parameters, which reside in the fingers searched and weighted, per user. The Rx and Tx are parallel processes; thus, Rx1 and Rx2 are used to demodulate the reverse link signals. The I and Q components represent schematically the Tx quadrature components per user.

The weighing of the polarization matching may be applied digitally at baseband, and then summed by combiners 5115. Returning to FIG. 5D, a processing unit may comprise amplitude/gain and/or phase adjustments 5105, combiners 5115, and processor 5110. The I and Q components are then duplicated and each component coupled with an amplitude/gain and/or phase adjustment 5105. In other words, the modulated I and Q components for each user are multiplied by weights (i.e., polarization coefficients) $a_k$ and $b_k$. The processor 5110, which may be an ASIC or a DSP device, determines the weights of the amplitude/gain and/or phase adjustments 5105, as noted above, based, in part, on input parameters (per channel element). The input parameters may include the number of fingers, and their relative amplitudes and phases (this, for example, is embedded in the RAKE complex weights). From these parameters, the processor 5110 determines the channel dynamics. For example, the rate of variations of the complex weights relate to the user speed; and the number of dominant fingers and the variations in the level of the fingers determine the type of channel. Combiners 5115 then sum up the weighted carriers into two complex baseband outputs, such as: $Baseband_1=\Sigma(a_n)(I_n+jQ_n)$; and $Baseband_2=\Sigma(b_n)(I_n+jQ_n)$, wherein a and b are the weights, and I and Q are the outputs of the channel elements 5100.

The outputs of the combiners 5115 are transmitted to modulators 5120, which accept the weighted sum of I and Q components. In turn, the modulators 5120 are electrically coupled to up-converters 5125. Up-converters 5125 are electrically coupled to transmit amplitude/gain adjustments and/or phase adjustments 5130, which are used for power amplification. Finally, the outputs of the modulators 5120 are transmitted to the cross-polarized transmit antenna arrangement 5140 (i.e., two antennas) via the electrically coupled connection.

The embodiments illustrated in FIGS. 5(A)–5(D) utilize information driven by the received return link signals to ensure that the transmitted signal polarization matches the polarization of the incoming signal. In doing so, forward link operation is enhanced and transmission losses due to polarization mismatches are significantly reduced.

The processor of FIGS. 5C and 5D, 5030 and 5110, respectively, detailed herein produces the polarization matching controls of the forward link, which serve for weighting the polarized transmissions. This processor is applicable to CDMA, GSM and other multiple access regimes. The polarization matching processors 5030 and 5110, for example, estimates the best instantaneous transmit polarization, per user, at the BTS. Since the transmitted polarization is linear, the polarization matching processor produces the orientation of the polarization, per user.

Figure 6:
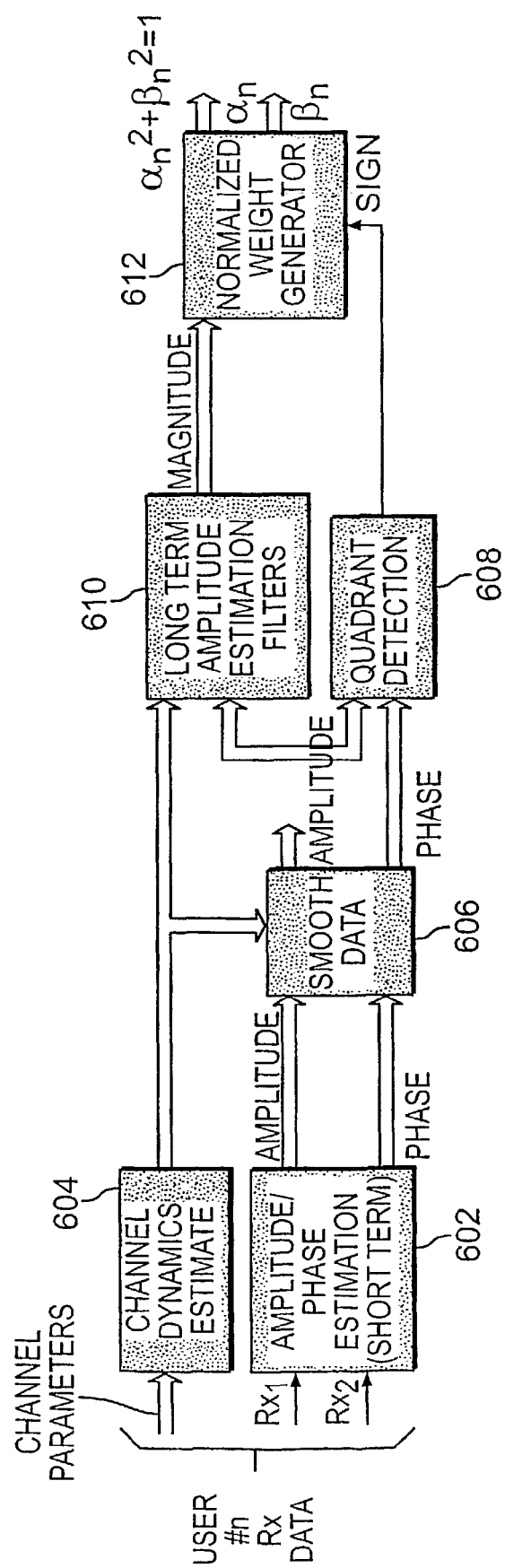
FIG. 6 is a high level diagram depicting the polarization matching processor.

In an FDM Cellular/PCS system, the polarization matching processor operates on the dual (orthogonal) polarization reverse link receptions, to produce forward link polarization matching weights, per user. FIG. 6 illustrates a block diagram of a polarization matching processor. As indicated in FIG. 6, receive signals $Rx_1$ and $RX_2$ are fed to an amplitude/phase estimation unit 602. The received signals are per user and contain parameters that characterize a channel. In a GSM system, the channel parameters reside in equalizer tap weights. In a CDMA system, the channel parameters reside in a RAKE receiver fingers' information.

The estimates from 602 are then smoothed (i.e., longer time constants for slowly time-varying situations) at 606 using the information about channel dynamics that are estimated at 604. The channel dynamic estimates are based upon reverse link data. These estimates affect the time constants of the filtering performed on the $Rx_1$ and $Rx_2$ receivers' snapshots. Channel dynamic estimates at 604 are fed to long term amplitude estimation filters 610.

The smoothed amplitude and phase information from 606 are fed to a quadrant detector 608 so that the sign of the relative phase can be estimated. This determines the quadrant (or pair of quadrants) of the transmitted polarization. The smoothed amplitude information is also fed to a filter 610 that estimates the long term amplitude of the corresponding reverse link. A time-varying magnitude (ratio between the two orthogonal polarizations) is based, in part, on the user-channel dynamics and the smoothed amplitude data. The time-varying magnitude is derived at 610 and is sent to a normalized weight generator 612 where a pair of Transmit control weights $\alpha$ and $\beta$ plus the sign from the quadrant detector 608 are generated; thereby producing the complex weight $W_n=\alpha_n\pm j\beta_n$ having a constraint: $|W_n|=1$, where the sign is determined from the quadrant detector 608.

In general, receivers employ a maximal-ratio-combining (MRC) diversity scheme, and an algorithm of a receiver MODEM diversity-combiner to optimally combine the two received samples. As such, processor need not receive snapshots $Rx_1$, $Rx_2$ but should receive the MRC (or other diversity combining scheme) parameters, namely the instantaneous, which means per symbol, or per slot diversity combiner outputs, amplitude ratios and relative phase between the two receiver channels. Thus, the "Amplitude/Phase Estimation (short-term)" block 602 outputs the short-term amplitude and phase.

If the outputs of the amplitude/phase estimation block 602 are not received from the receiver MODEM diversity-combiner, then the outputs are determined as follows. First, the vectors $Rx_1$, $Rx_2$ are processed such as to consider only the un-faded portions of the vectors. As such, the data of the faded time-portions of the vectors (i.e., $\geq F_{[dB]}$ below moving-average mean level, 3<F<7 a parameter) is eliminated. Then, the relative phase and amplitude of the processed vectors $Rx'_1$, $Rx'_2$ are estimated using the short-term (moving-average) complex normalized-covariance between the vectors $Rx_1$, $Rx_2$.

When the optimal polarization coincides with the crossed polarized receive antennas, the phase detector output produces errors. Thus, the inputs to the "Quadrant Detector" (i.e., the two amplitudes, or rather their ratio) are discriminated against in boundary situations to produce the correct phase.

Figure 7:
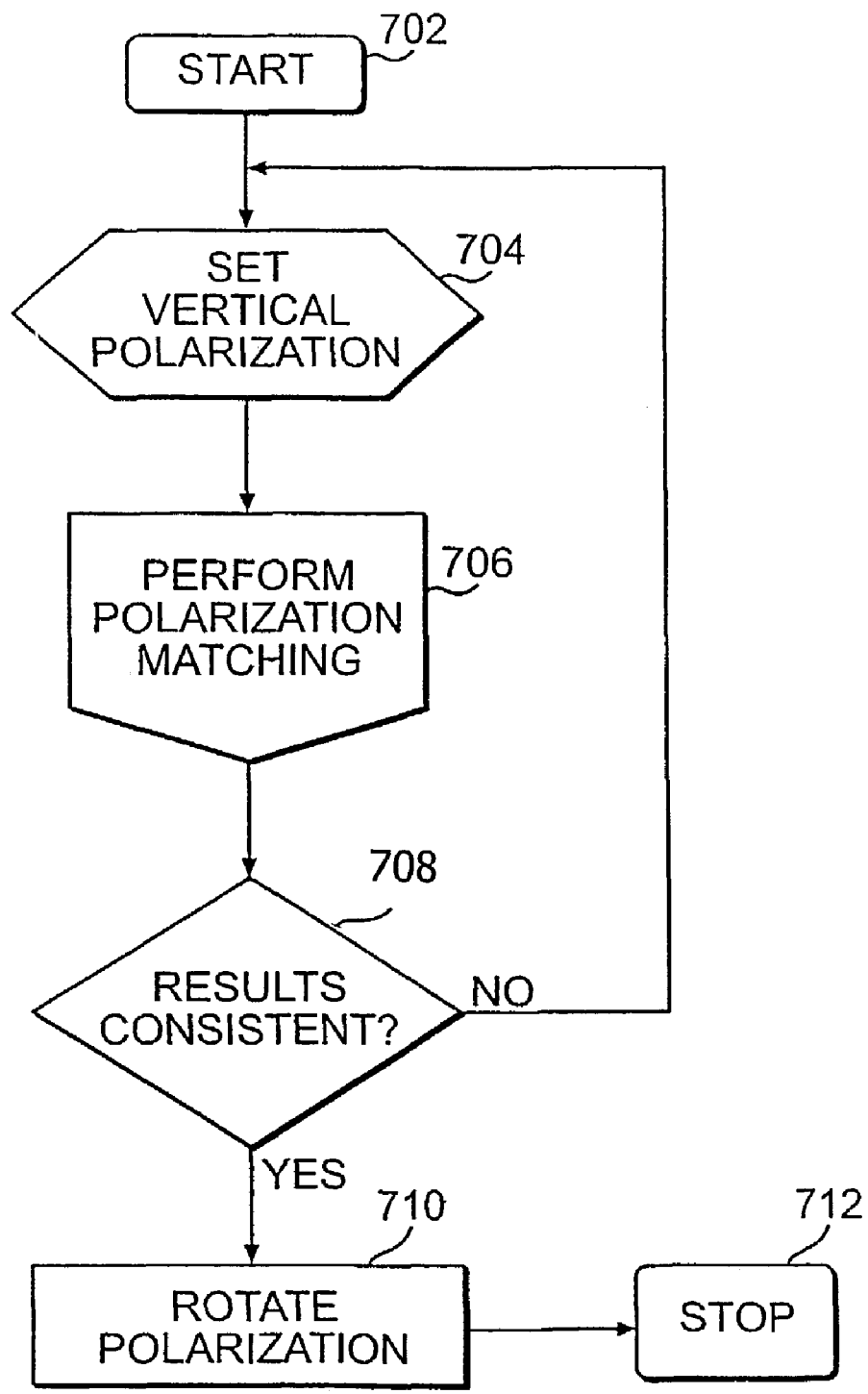
FIG. 7 is a flowchart of one embodiment of the polarization matching processor algorithm.

FIG. 7 is a flow chart illustrating the method to control polarization. The method is applied to each user independently. The method begins at block 702 and control passes to block 704. At block 704 a default vertical polarization is set (i.e., $\alpha_n=\beta_n=\sqrt{2}/2$). The selection of a default vertical polarization is based upon the fact that base stations employ a plurality of vertically polarized antennae which in-turn complement the vertically polarized antennae of most mounted mobile stations that are non-handheld. After the default vertical polarization is initialized at block 704, control passes to block 706.

At block 706, polarization matching is performed as previously discussed with regard to FIG. 6 to produce an estimated polarization weight. Control then passes to block 708.

At block 708, it is determined whether the estimated polarization weight results obtained in block 706 are consistent. If the results from block 706 are unstable or there are abrupt changes in the polarization estimates, then control passes to block 704 to set the polarization to the vertical polarization default state.

If the results are determined to be consistent at block 708, then control passes to block 710. At block 710 the polarization of the transmit antennas is rotated to match the estimated polarization determined at block 706. Control passes to block 712 in which the method to control polarization ends.

The information of each user may be compiled as an aggregate of the controls of all users, which may serve to evaluate fault performance and management of the BTS. For instance, if a large proportion of the weights of the BTS vary abruptly for most or all of the users, it may be inferred that a moving object, such as a vehicle or a person, is in close proximity to the BTS antennas.

Based upon the above embodiments, the following hardware constraints may be considered:

The antennas may contribute the following errors: (1) Non-coinciding phase centers for the two polarizations, in Rx and in Tx will induce an error that is dependent on the angle of arrival (AOA). Thus, care must be applied in the design of the BTS antennas to the phase centers for the two polarizations (Rx or Tx) so that they closely coincide. (2) The relative gains of the two polarizations, in Rx and in Tx, should track each other. Thus, the dB difference in gains between the two Rx antennas, and between the two Tx antennas over the sector angular span should be near 0 dB.

The relative gain response [dB] and relative phase response [°] between the two Rx paths, between the two Tx paths, and between the Rx pair and the Tx pair, is important for the successful operation of the polarization matching processor. These parameters should to be known over frequency and temperature.

The RF chains in Rx should track in amplitude and in phase, or be calibrated over temperature and frequency. A stored calibration table may then be used to correct for any phase and/or amplitude discrepancies between the two Rx chains, and similarly for the two Tx chains.

A mobile unit which is located at some distance from the BTS with a dual polarization antenna, which reports its measurements of the pilot signal (in a CDMA system) may be used to calibrate and validate the operation of the system.

Upon switching the two cross-polarized antennas at the stationary mobile, the receptions of the pilot as well as the transmissions to the BTS will vary at the switching rate. The transmissions may be processed at the BTS to produce the polarization angle mismatch between the reverse and the forward link, and correct for it with a suitable unitary transformation at the polarization matching processor.

Figure 19:
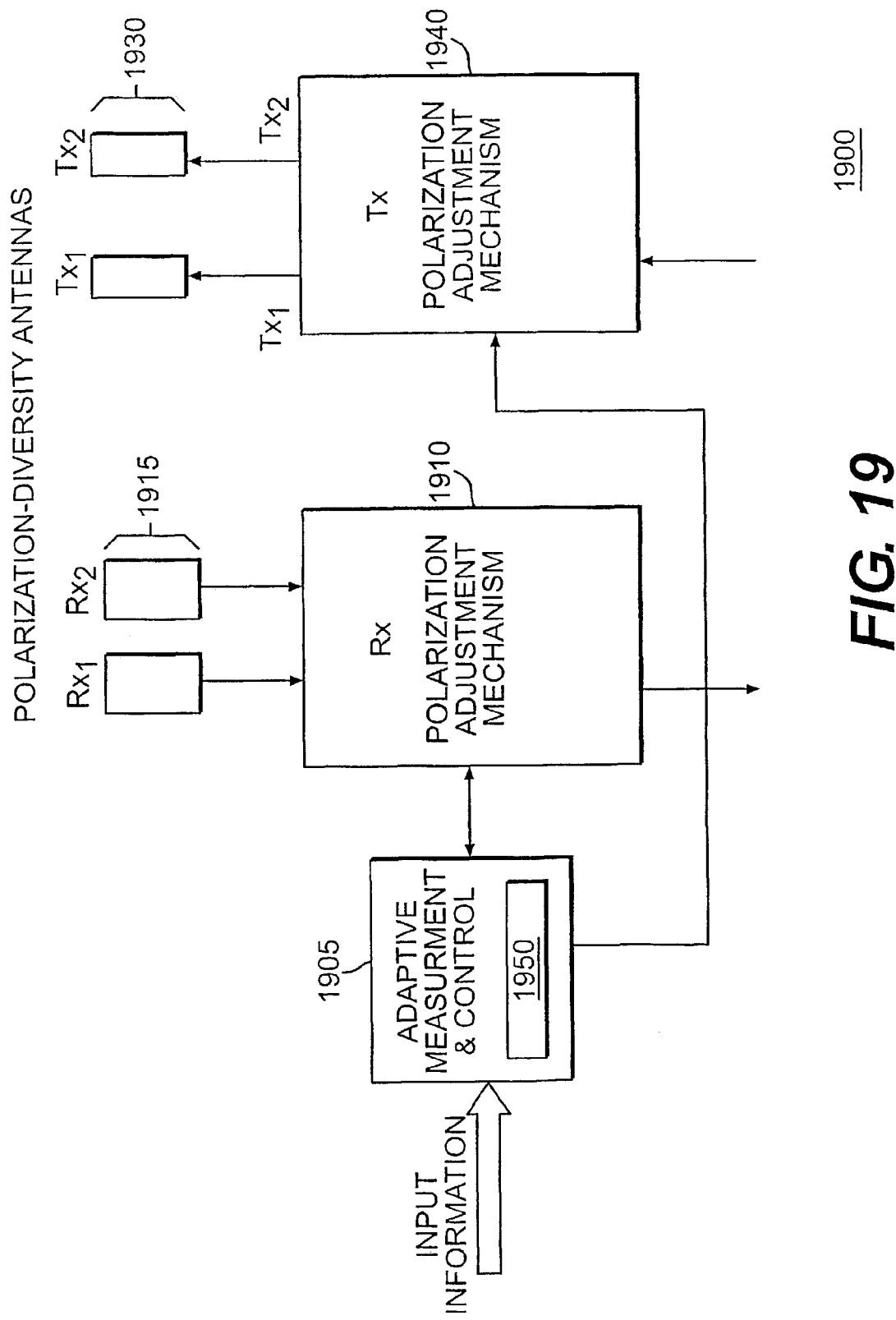
FIG. 19 is a high level diagram depicting polarization matching mechanism.

In polarization matching, the polarization orientation in transmitting (per user) is adaptively determined based on the average orientation estimated from the reverse link. FIG. 19 gives a high-level block diagram of polarization matching where the reverse link signal (per active user) received by two Rx cross-polarized antennas is processed to generate a pair of scalar weights (including sign). The weights are then used to determine the relative gain of each of the transmit forward link signals to be transmitted via the cross-polarized Tx antennas.

To implement polarization matching, there are many system considerations such as power constraints. Since transmission losses caused by polarization mismatch further affect other performance related measures (e.g., power usage, self-interference, or signal-to-noise-plus-interference), implementations under different considerations yield different overall performance. What is needed is effective implementations for polarization matching, preferably in both forward and reverse transmissions, that not only mitigates the transmission losses but also performs to a maximum efficiency with respect to various measures.

In system 1900, when the incoming signals $Rx_1$ and $Rx_2$ from a reverse link are received from antenna pair 1915, a set of measurements are adaptively estimated at 1905. Such measurements are related to both fast and slow fading. Particularly, the average orientation of the corresponding MS is estimated at 1950. Based on the measurements from the receive signals, a set of control parameters may be generated at 1905. The control parameters include the parameters that are used to adjust the polarization orientation. The polarization control parameters may be fed to an Rx polarization adjustment mechanism 1910 so that the polarization orientation for the receive link can be matched with the average orientation. At the same time, the polarization control parameters for the forward link can be sent to a Tx polarization adjustment mechanism 1940 to re-orient the polarization of the transmit link so that signals can be sent out over a pair of polarization-diverse antenna 1930 in an optimized polarization orientation.

In implementing the embodiments for polarization matching as described above, there are many system considerations that may ultimately affect the performance. Examples of such considerations include polarization diversity, power constraints, and choices of baseband/RF/IF implementations. Alternatives of polarization diversity can be, for example, space-separated diversity, circular-polarization, or cross-polarization. For power constraints, one major issue related to systems is the underlying Tx power constraints, in conjunction with polarization matching and the BS power control methodology.

The present invention presents various implementation embodiments for both receive polarization adjustment mechanism and transmit polarization adjustment mechanism under different system considerations. In particular, RF/IF and baseband system implementations are presented. Alternative implementations that satisfy different power constraints are presented. The implementations of polarization matching in both forward and reverse link are also presented. Finally, implementations of polarization that comply with different standards are illustrated.

Considering a forward link, given a desired transmit polarization orientation (derived from the receive signals at the base-station from the same user), the transmit signal is to be sent at a slant angle off the vertical reference orientation in the range of (−90°, 90°). To do so, the implementation of polarization matching requires two orthogonally polarized antennas that simultaneously transmit two replicas of the transmit waveform, with a predetermined electrical phase shift and relative gains between the two replicas. Usually the two antennas are realized as cross-polarized ±45° linearly polarized antennas.

Figure 20:
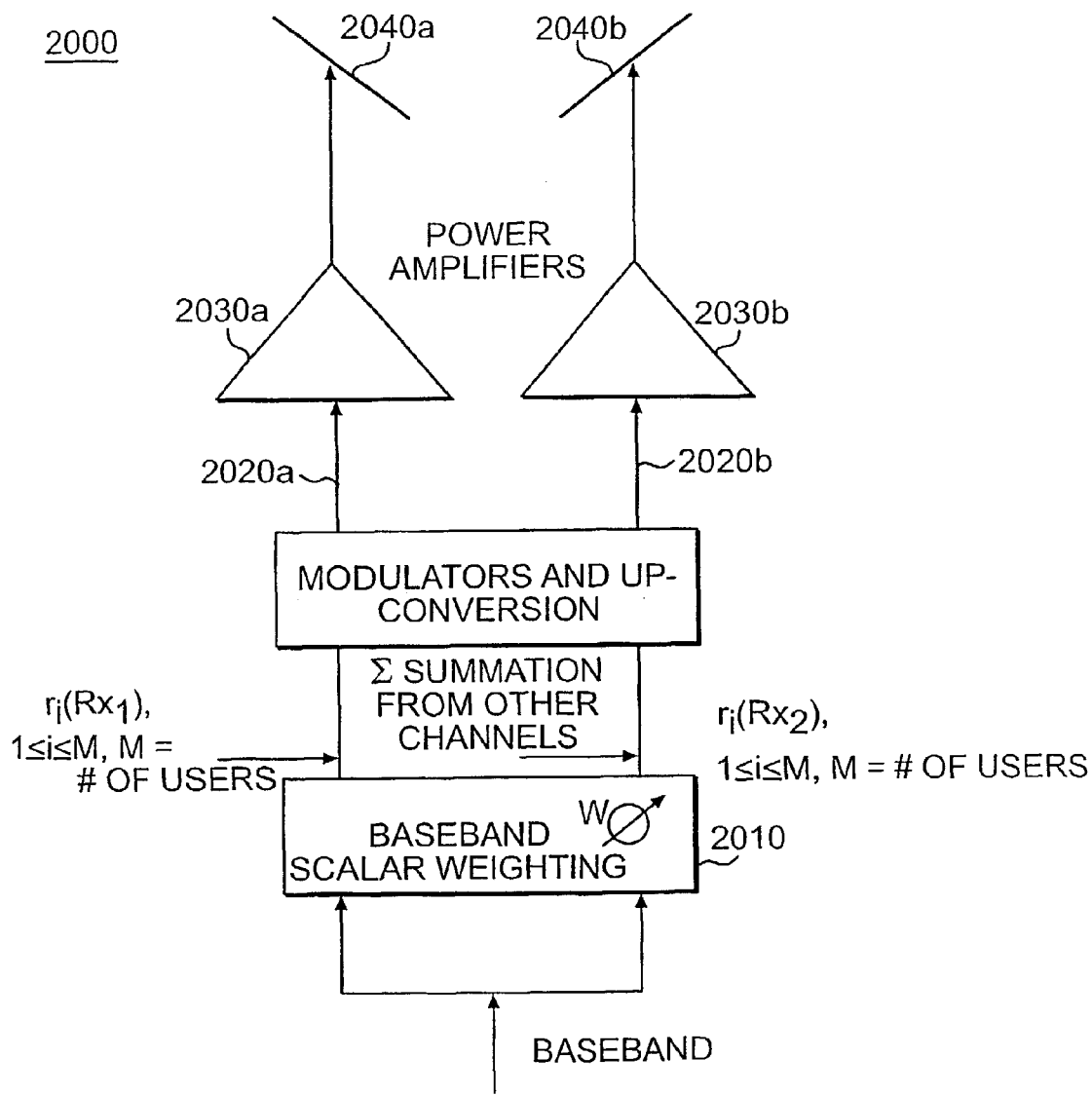
FIG. 20 is a high level diagram illustrating an embodiment of the invention.

FIG. 20 depicts polarization matching system 2000, constructed and operative in accordance with the present invention. System 2000 implements a baseband scalar weighting function to achieve polarization matching. In particular, system 2000 comprises baseband processor 2010, which produces two replicas of the transmit signal (in complex I-Q vectors). An appropriate complex weight is applied to one arm (relative to the other). This weight (less calibration) represents an amplitude weight plus sign. The two replicas are subsequently applied to a pair of dual coherent (sharing a common local oscillator—(LO)) modulators and up converters 2020a and 2020b. The modulated pair of replicas are then supplied to a pair of linear power amplifiers 2030a and 2030b. Finally the amplified signals are fed to the cross-polarized antennas 2040a and 2040b in order to effect signal transmission.

Figure 21:
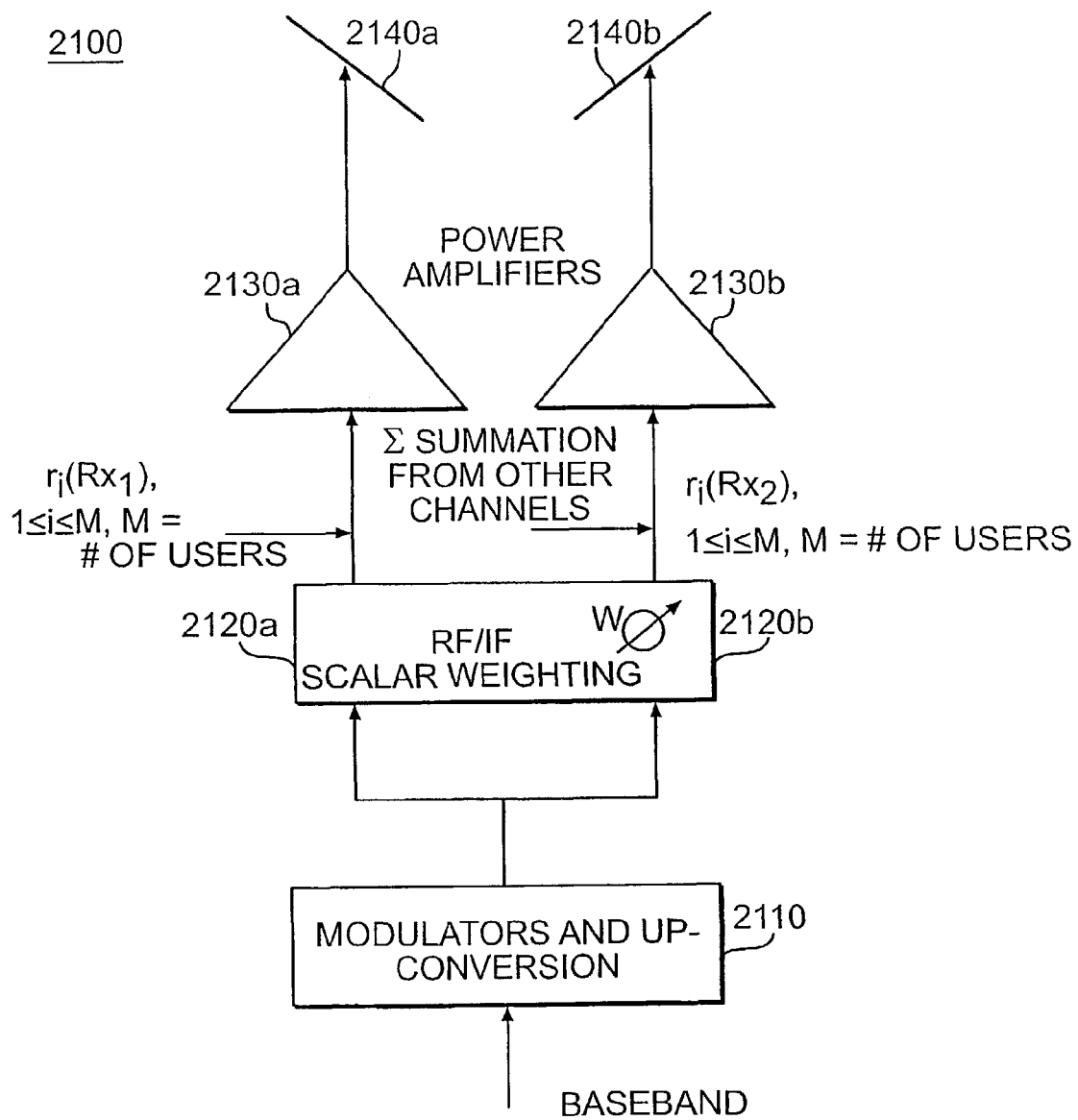
FIG. 21 is a high level diagram illustrating an embodiment of the invention.

FIG. 21 illustrates polarization matching system 2100, constructed and operative in accordance with another embodiment of the present invention. System 2100 implements a scalar weighting function in the RF/IF portion to achieve polarization matching. In system 2100, baseband processor 2110 supplies the transmit signal to modulator and up-converter 2110 because only one modulator and converter 2110 is required, which is then multiplied by the number of users. I and Q vectors of the up-converted signal are fed to RF/IF portion 2120a,b with an appropriate complex weight applied to one arm. The output of 2120a,b are then combined with other channels and fed to power amplifiers 2130a,b for transmission.

In the two implementation schemes noted above (as well as other implementation schemes discussed below), it is assumed that the total transmit power required is preserved or possibly reduced in some scenarios. Therefore, each of the two power amplifiers in these implementations should be specified to 50% of the power required by the original single power amplifier used in a configuration with a single vertically polarized transmit antenna.

Figure 22:
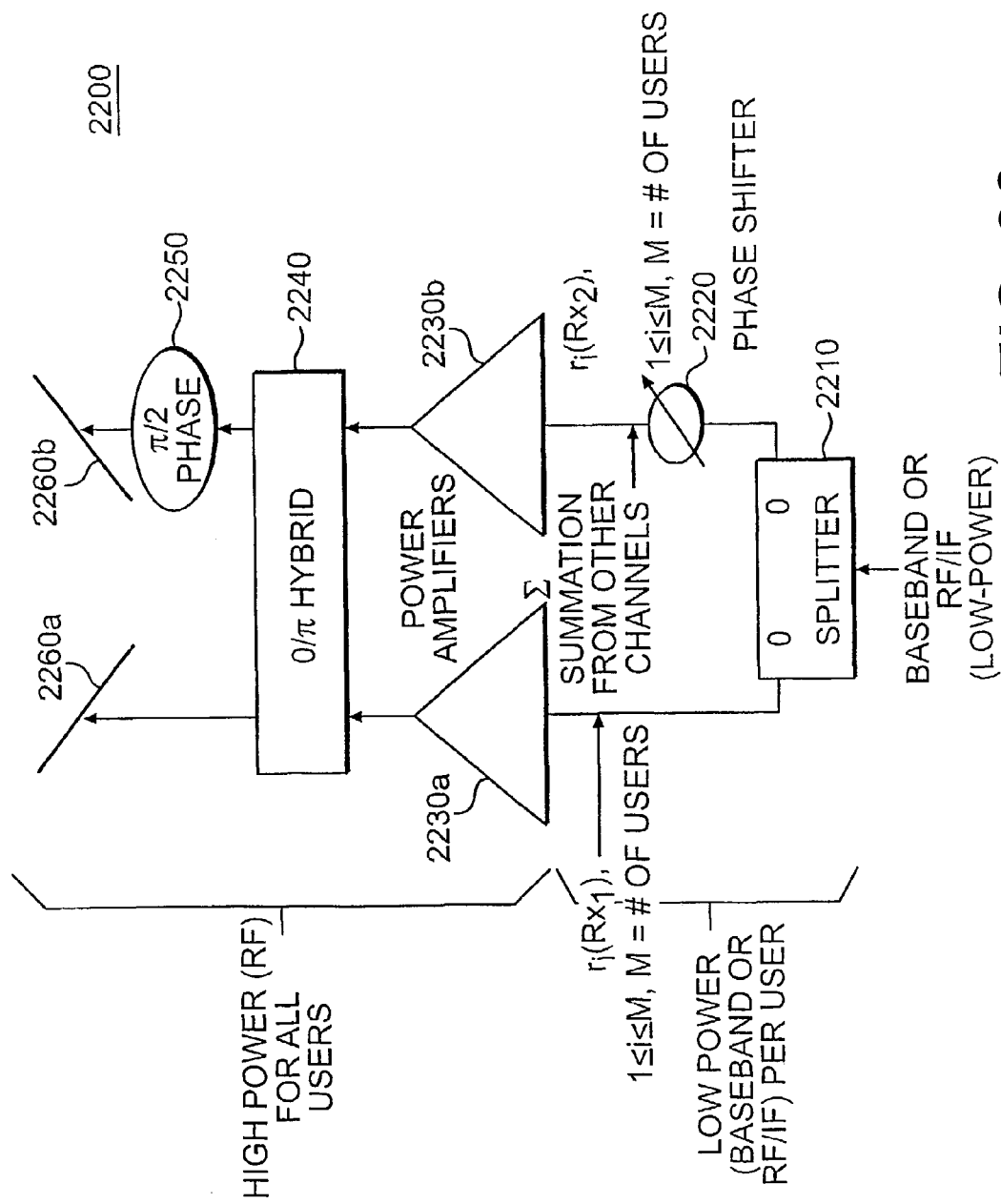
FIG. 22 is a high level diagram illustrating an embodiment of the invention.

FIG. 22 illustrates polarization matching system 2200, constructed and operative in accordance with another embodiment of the present invention. System 2200 incorporates both a baseband and an RF/IF polarization matching implementation. In system 2200, a maximum power requirement per amplifier is guaranteed, both per user and per all users.

As indicated in FIG. 22, two equal-power versions of a transmit signal are generated at splitter 2210. Phase shifter 2220 shifts the phase of one of the two equal-power signals to create a phase difference between the two. The phase shift is performed at 'low power' (i.e., baseband—preferably, or RF, or even IF, if one prefers to use a dual coherent up-converter). These two equal level signals are then applied to the power amplifiers 2230a and 2230b. Thus, a maximum utilization of the two amplifiers is guaranteed. The 0/π hybrid 2240 produces, as its outputs, both a sum and a difference of its inputs (the two amplified equal power signals). Even though these two outputs are not necessarily of equal amplitudes, they are always orthogonal to each other. Finally, phase shifter 2250 imposes a 90° shift to align the two signals back before they are applied to the cross-polarized antennas 2260a and 2260b.

The splitter 2210 and the phase shift 2220 must be performed on a per-user basis. They may be performed at baseband or IF or Low-Power RF. All of the users' two channel (equal power) outputs are summed in each corresponding arm before entering the power amplifiers as well as the dual-polarized antennas.

Since the transmissions from all users are equally split between the two arms and the two equal-power signals are uncorrelated, the sums across all users in the two arms are also equal. This realization method, therefore, guarantees a full loading of the two power amplifiers for any polarization Matching setting with respect to any user.

Figure 23:
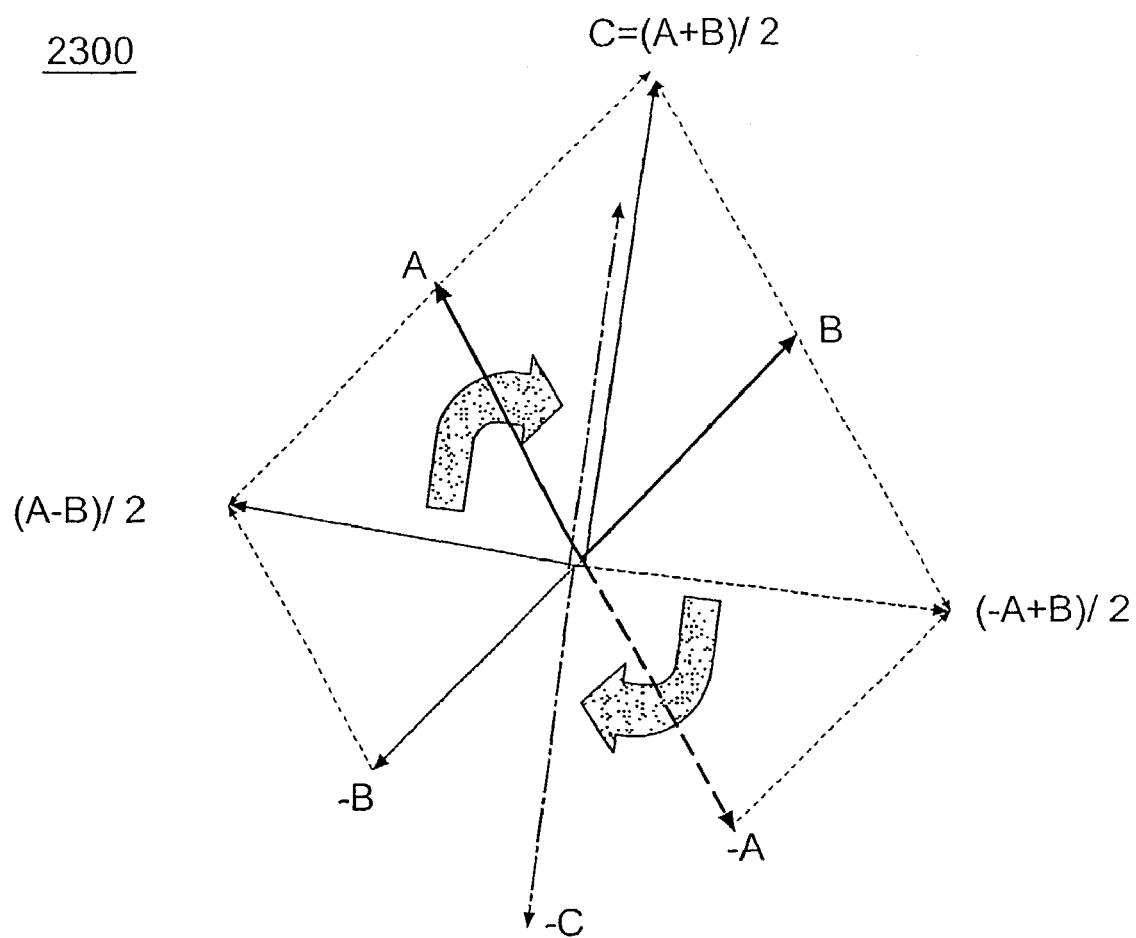
FIG. 23 is a phasor diagram illustrating the principle of equal power realization.

The phasor diagram in FIG. 23 illustrates the fundamentals of the operations described above. Assume that the input vector is split into two equal vectors, one of which is rotated by a phase shifter. At baseband, this rotation operation may be performed via a 2×2 matrix operation (sometimes referred as CORDAC). It is basically a scalar amplitude plus sign (calibration is not included). The resulting (equal size) phasors are denoted by A and B in FIG. 23. The vector representing the sum of A and B is denoted by A+B and the vector representing the difference of A and B is denoted by A−B. The sum vector A+B bisects the angle formed by vectors A and B. The different vector A−B bisects the angle formed by A and −B. Since the two angles formed by AB and A(−B) (each belonging to a different rhombus) complement each other to 180°, the angle between the sum vector A+B and the difference vector A−B is 90°. A continuous wave (CW) rotation of the sum vector (or the difference vector) by 90° co-aligns the two vectors, producing an linear polarization with the orientation determined by the ratio between the magnitudes of the sum and the difference vectors. This ratio is determined by the amount of phase shift between A and B.

It is possible to use a different phase shift, instead of a shift within a fixed range (between 0° and 180°), to get −A to produce both vectors A+B (as before) and −A+B. In this way, vector −C, instead of C, can be obtained after a CW rotation. Therefore, with a (0°–360°) variable phase shifter, together with a hybrid and a fixed 90° shifter, it is possible to achieve any linear polarization orientation. Using the cosines equation, it can be demonstrated that for polarization angle ψ, which is a function of the electrical phase shift φ, the following holds:

$$\psi = tg^{-1} \sqrt{\frac{A^2 + B^2 - 2AB\cos\phi}{A^2 + B^2 + 2AB\cos\phi}}$$

When A=B, the following equality can be derived:
This equality means that the polarization slant angle ψ is one half of the

ψ=φ/2 electrical shift φ. As for the resultant polarization slanted vector, its size will be $\sqrt{2}*A$ regardless of the value of φ (or ψ). Therefore, the resultant power is the sum of the two outputs of the two power amplifiers (per user).

It is commonly known that when a vertically polarized transmission from a BS results in a polarization mismatch, higher transmitting power is required to compensate the polarization transmission losses. The increased transmitting power subsequently causes increased self-generated interference. In the illustrated embodiments of systems 2000 and 2200 (FIG. 20 and FIG. 22, respectively), such polarization mismatch losses are recovered by driving the power amplifiers at non-equal vs. equal power levels, per user.

The implementation of system 2200, where two equal power components (per active user) drive the two power amplifiers, guarantees a uniform and efficient utilization of the amplifiers. Such a uniform utilization of the amplifiers is also guaranteed for a collection of active users. This desirable characteristic is due to the fact that the unequal components that constitute the slanted polarization vector are generated after the power amplification (by the 0/π hybrid at 2240). Even though the power levels to the amplifiers may vary from one user to another due to the different underlying power control requirements at the BS, the inputs to the pair of power amplifiers 2230a and 2230b at any given moment are always at an equal power level. As a comparison, the polarization matching implementations used in systems 2000 and 2100 where each amplifier usually gets (per user) non-equal power levels, the unequal components that constitute the slanted polarization vector are generated before the power amplification stage.

Loading of power amplifiers is one of the main considerations in Cellular/PCS transmission systems and is directly related to the performance of the linear power amplifiers. There are different alternative approaches to realize power control. One approach is to control the total transmitted power by an instantaneous peak-power limitation. A different approach may be to specify a constraint on the maximum total mean power out of the linear power amplifier. Yet another possible approach is to constrain the power transmitted per active user under a fixed total mean power constraint employed at a BS.

The implementation of polarization matching per active user may employ one of the two power constraint rules described below. One rule is to have the two weights sum up to 1 (as indicated in FIG. 6). In this manner, when the required polarization matches one of the two Tx cross-polarized antennas, the weight is 1 for the transmitting antenna arm that matches the required polarization orientation and the weight for the other is obviously 0. For any other polarization orientation, the two weights (per active user) are attenuated such that the magnitude of the resultant polarization is still 1. This amounts to a fixed power constraint per active user.

A different rule may also be applied. Instead of summing to 1, the sum of the two scalar weights may be greater than 1. The two scalar weights are managed such that at least one of them is 1, and the other is less than or equal to 1. When the required polarization is aligned with one of the cross-polarized Tx antennas, the weights will be 1 and 0 as in the first rule. When the required polarization orientation is ±45°, both weights will be set to 1. For any other polarization orientation, one weight (the larger of the two) will be set to 1, while the other will be less than 1. This type of power control does not preserve the total power but guarantees a pick power limit for each arm (per active user).

It is assumed here that, due to emission requirements, there exists a constraint that limits the maximum mean power at the output of the power amplifier. Such a constraint is usually also associated with a related peak power constraint. For example, a combined constraint can be that the ratio between the peak and the mean power obeys some limit (e.g., peak-to-mean=10 dB).

Figure 24A:
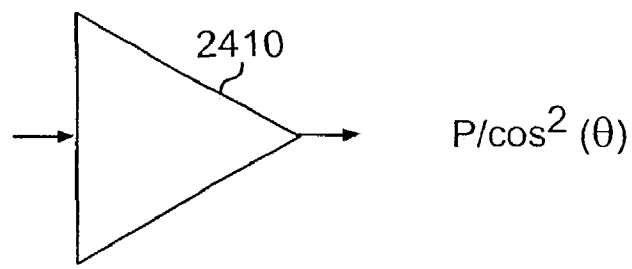
FIG. 24 compares the loading of power amplifiers.
Figure 24B:
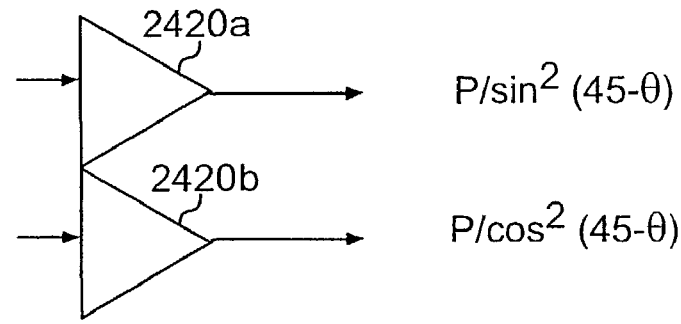
Figure 24C:
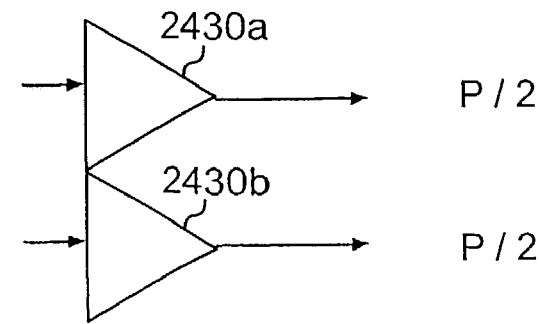

The amplifiers' loading situation related to the three different implementations of systems 2000, 2100, 2200 for polarization matching are analyzed in FIGS. 24(a)–24(c), respectively. These three cases are (1) vertically polarized transmission illustrated in FIG. 24(a), (2) cross-polarized transmission with the weighting applied prior to the power amplification (FIG. 24(b) or the implementations illustrated in FIGS. 20 and 21), and (3) cross-polarized transmission with the weighting applied after the power amplification (FIG. 24(c) or the implementation illustrated in FIG. 22). The required power is denoted by P and the required polarization orientation is denoted by θ. Assuming a certain probability distribution of θ and a certain distribution of the required power P, the loading of the power amplifiers for the three cases are presented.

The reference loading at the output of the amplifier for the first case is P, whereas for the second and the third cases ("half size" amplifiers), the reference is ½P.

In the first case (FIG. 24(a)), there is a significant overload due to the (cos θ)$^{-1}$ factor. Based on various statistical assumptions about the probability distribution of θ, overload of 5 dB per user (over P) may easily occur. In the second case (FIG. 24(b)), there is a possible overload due to the factor 2 sin$^2$(45−θ) (or similarly with 2 cos$^2$(45−θ))) of up to 3 dB, per user, over P/2.

With k users, the probability of exceeding the specified maximum mean power may decrease, depending on the statistics of P and θ per user and the number of users k. Usually, to avoid the overload of the power amplifiers, a peak (total) power limit is enforced at the base-station. This means that some users will be deprived the power they need to sustain quality communications, even though it may be only a few percent out of the total population of served users.

In the third case (FIG. 24(c)), each power amplifier guarantees to provide exactly P/2 and thus the power amplifiers are fully and evenly loaded. This is the most efficient case of all three. Such power control is maintained by phase only, and is performed (practically) per user at the baseband.

Figure 25A:
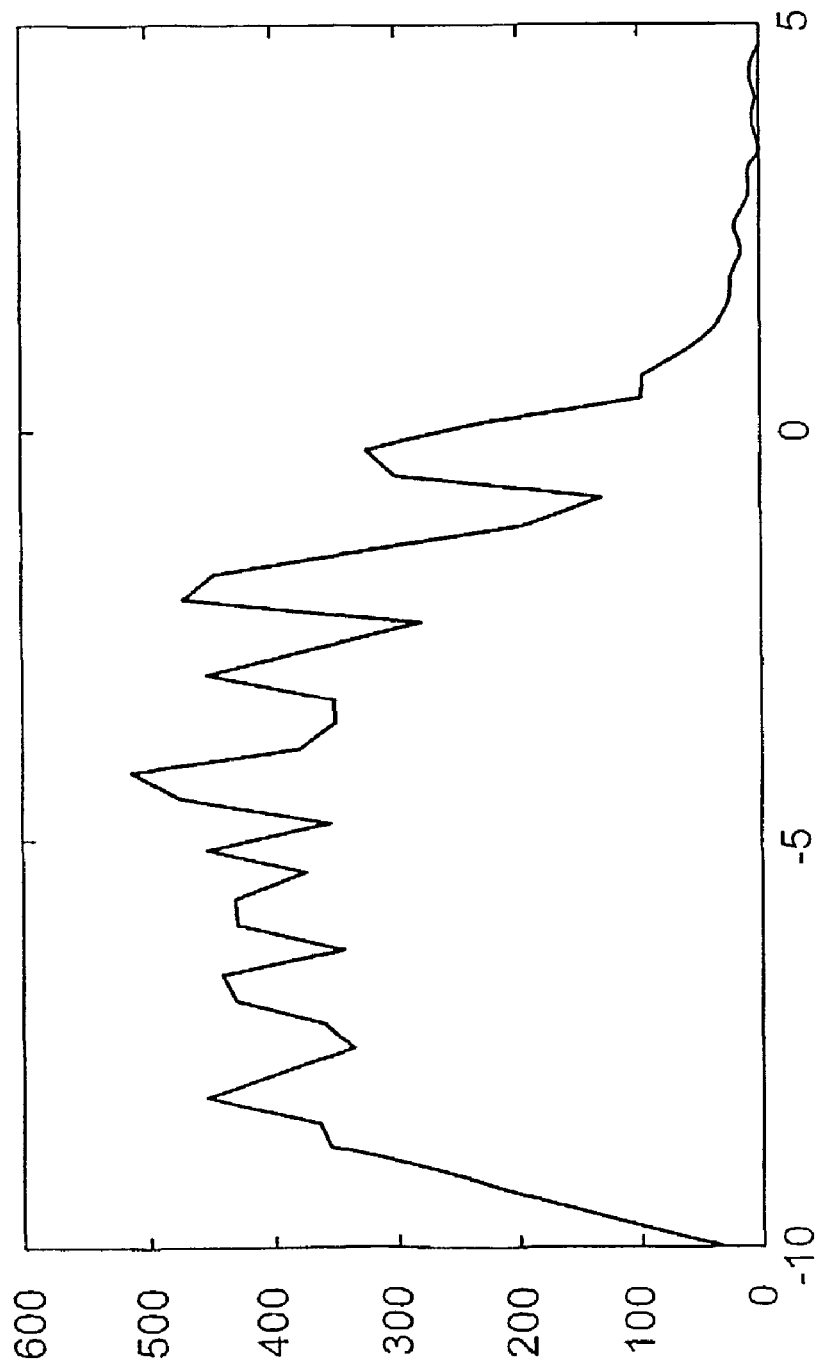
FIGS. 25A–25C illustrate the histograms.

FIGS. 25(a–c) shows the simulation results with respect to the diversity gain in above described three cases. In the simulations, the power requirement P varies uniformly between 0 dB to −10 dB and the polarization angle θ around the vertical polarization orientation (0°) follows a normal distribution N (0°, 17°). Such simulation conditions may represent a single user or a collection of users. The plots in FIGS. 25(a), (b), and (c) correspond to the three cases, individually. In each plot, the horizontal axis is the relative required power in dB, with 0 dB to be the maximum allowable power out of the amplifier. Several important observations can be made from these plots.

One observation from those plots is that in configurations (a) and (b) there is an overload probability greater than 0 (e.g. ~6% in (a), and ~10% in (b)), whereas in (c) there is no overload. Another observation is that in (a) the power spread is from an overload value to not less than −10 dB. In case (b) it is between an overload value and some −22 dB, whereas in case (c) it is strictly between 0 dB and −10 dB.

Figure 25B:
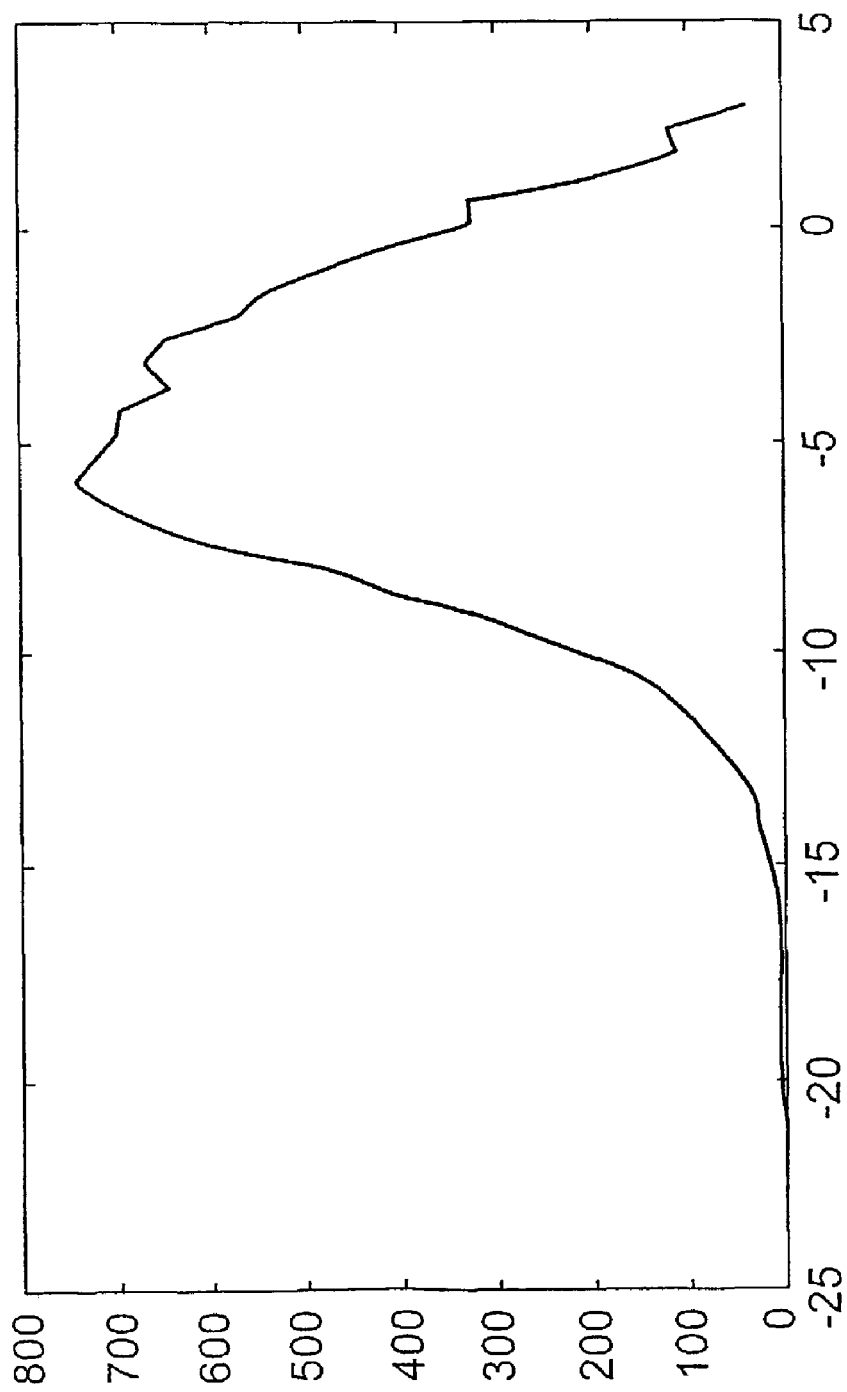
Figure 25C:
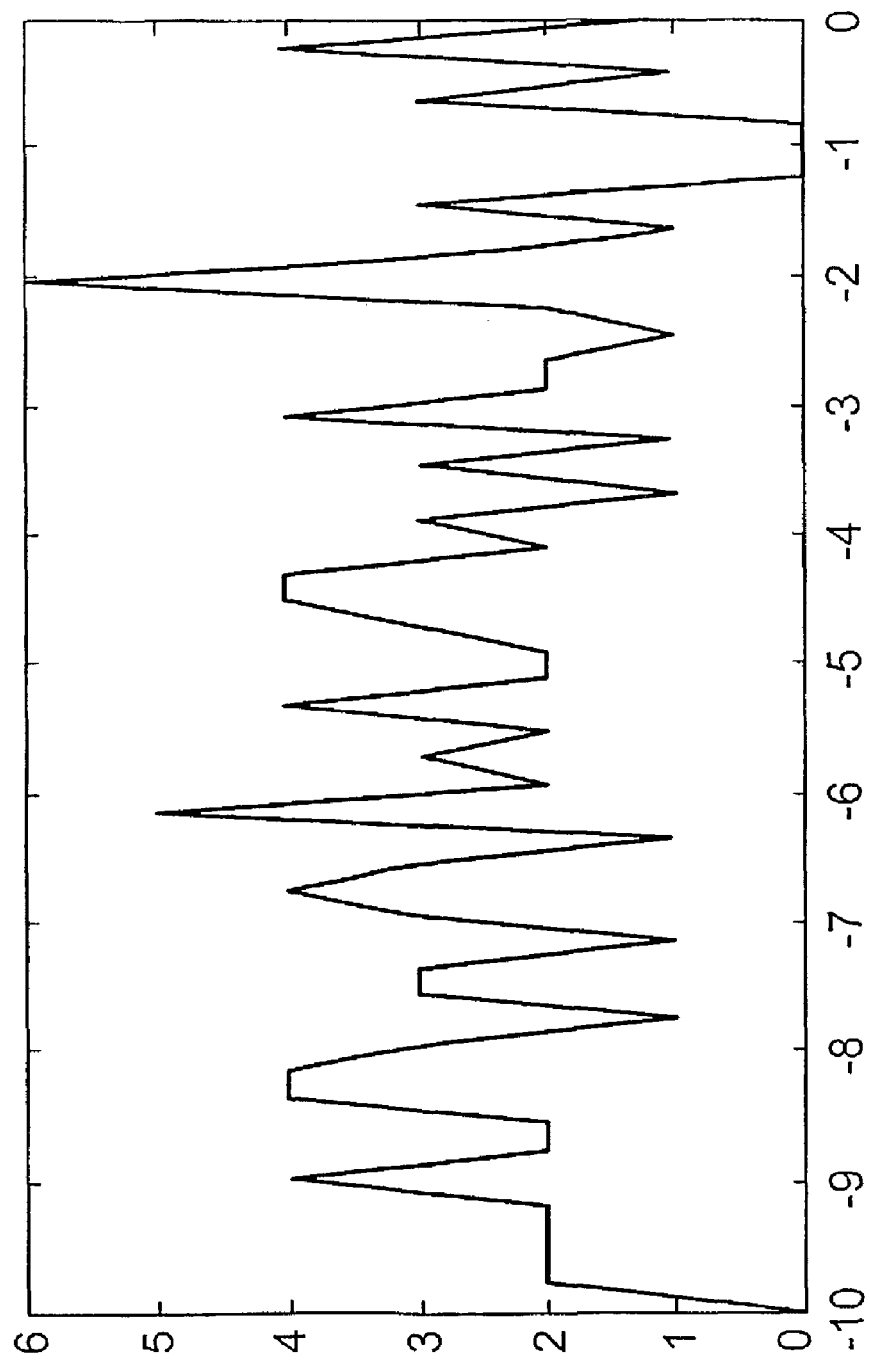

Yet another observation is that the distribution in FIG. 25(a) (corresponding to the first case) has a broad (but not uniform) shape; in FIG. 25(b) (corresponding to the second case), it is more peaked (although within 0 dB to −10 dB very similar to FIG. 25(a)); in FIG. 25(c) (corresponding to the third case), it is uniform, similarly distributed as the power requests.

Figure 28:
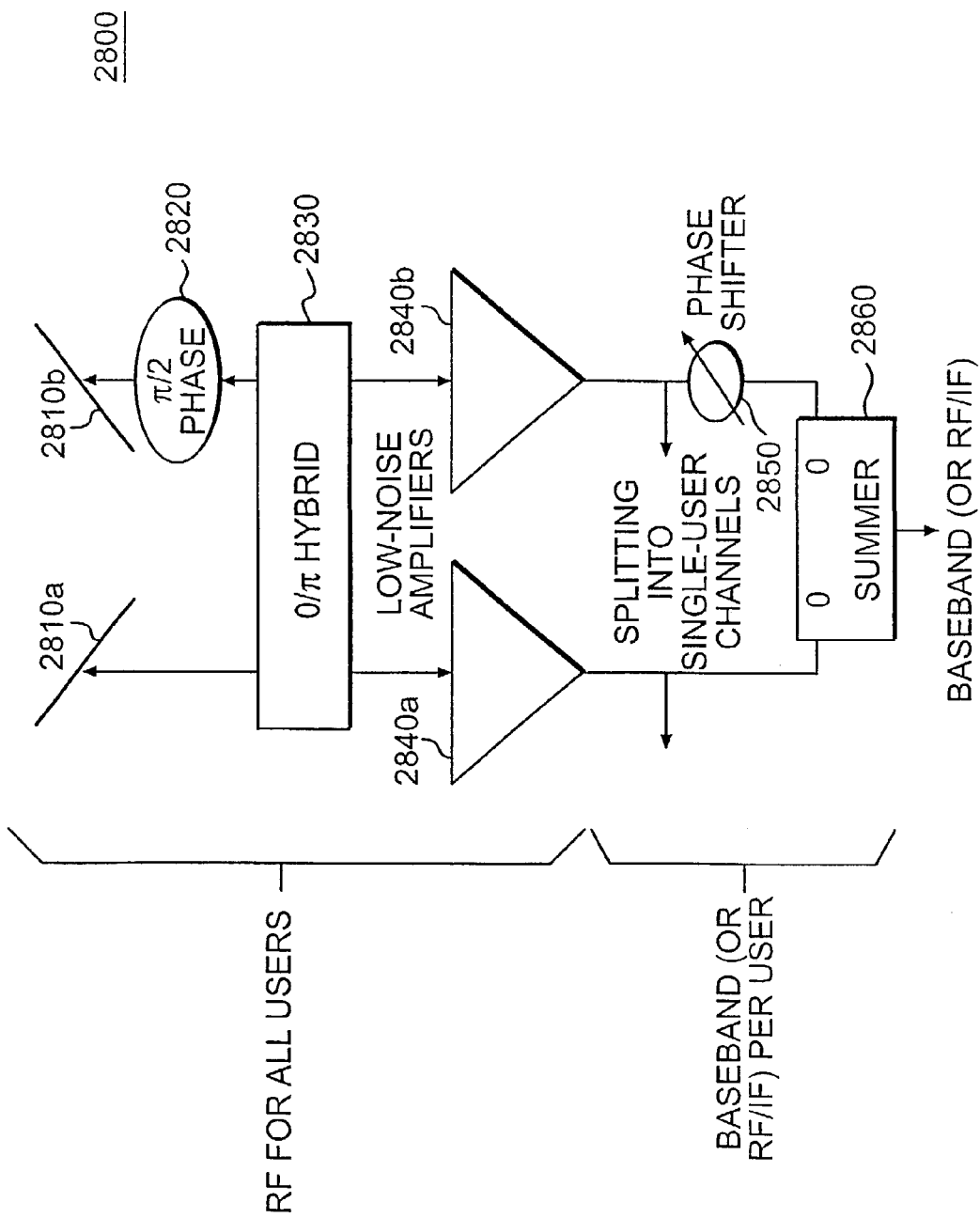
FIG. 28 is a high level diagram illustrating an embodiment of the invention.
Figure 29:
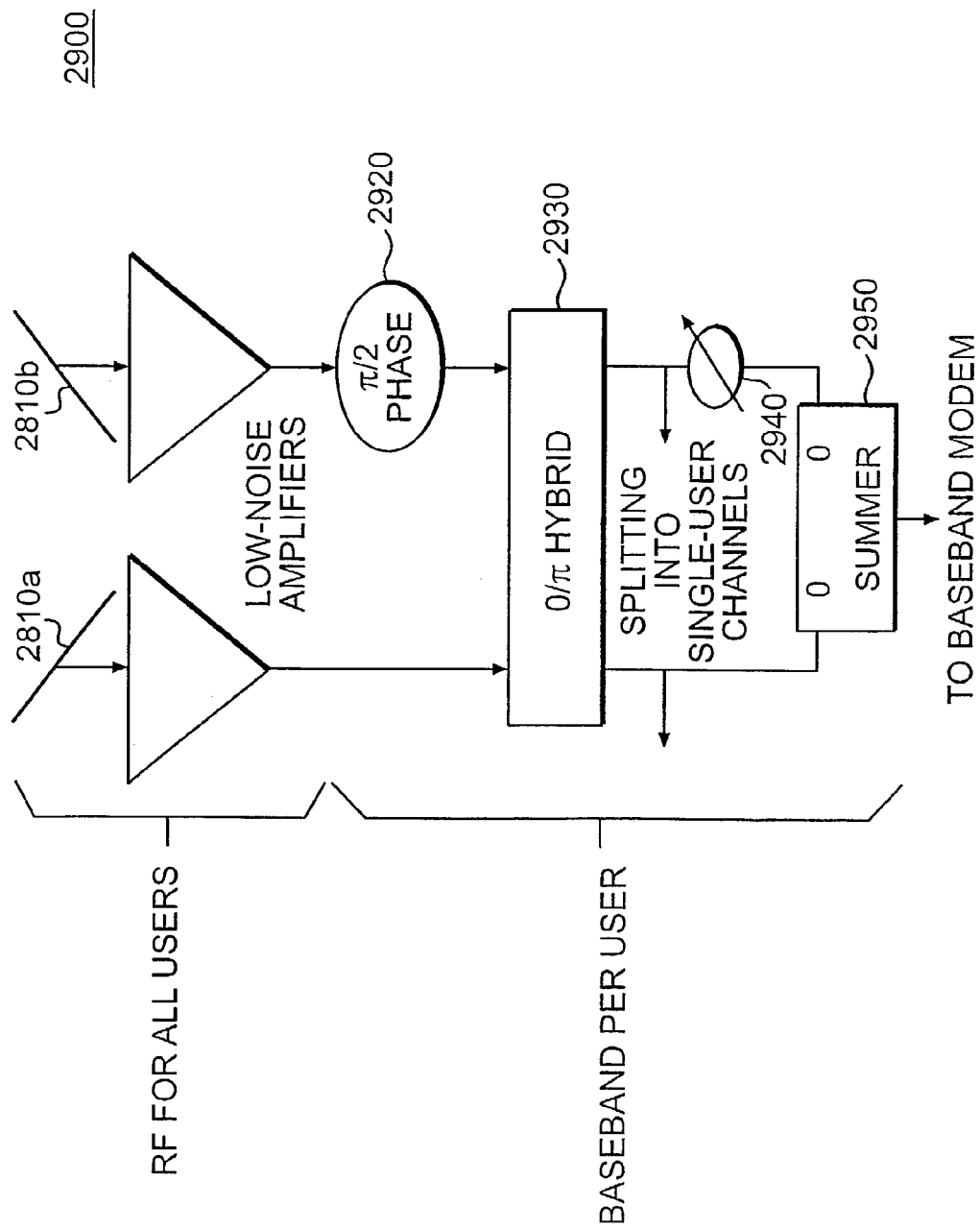
FIG. 29 is a high level diagram illustrating an embodiment of the invention.

The implementations presented in systems 2000, 2100, 2200 realize polarization matching in the forward link. As for a reverse link, three implementations, systems 2700, 2800, 2900, illustrated in FIGS. 27, 28, and 29 allow equal power reception for any polarization orientation to achieve maximum diversity gain.

Figure 26:
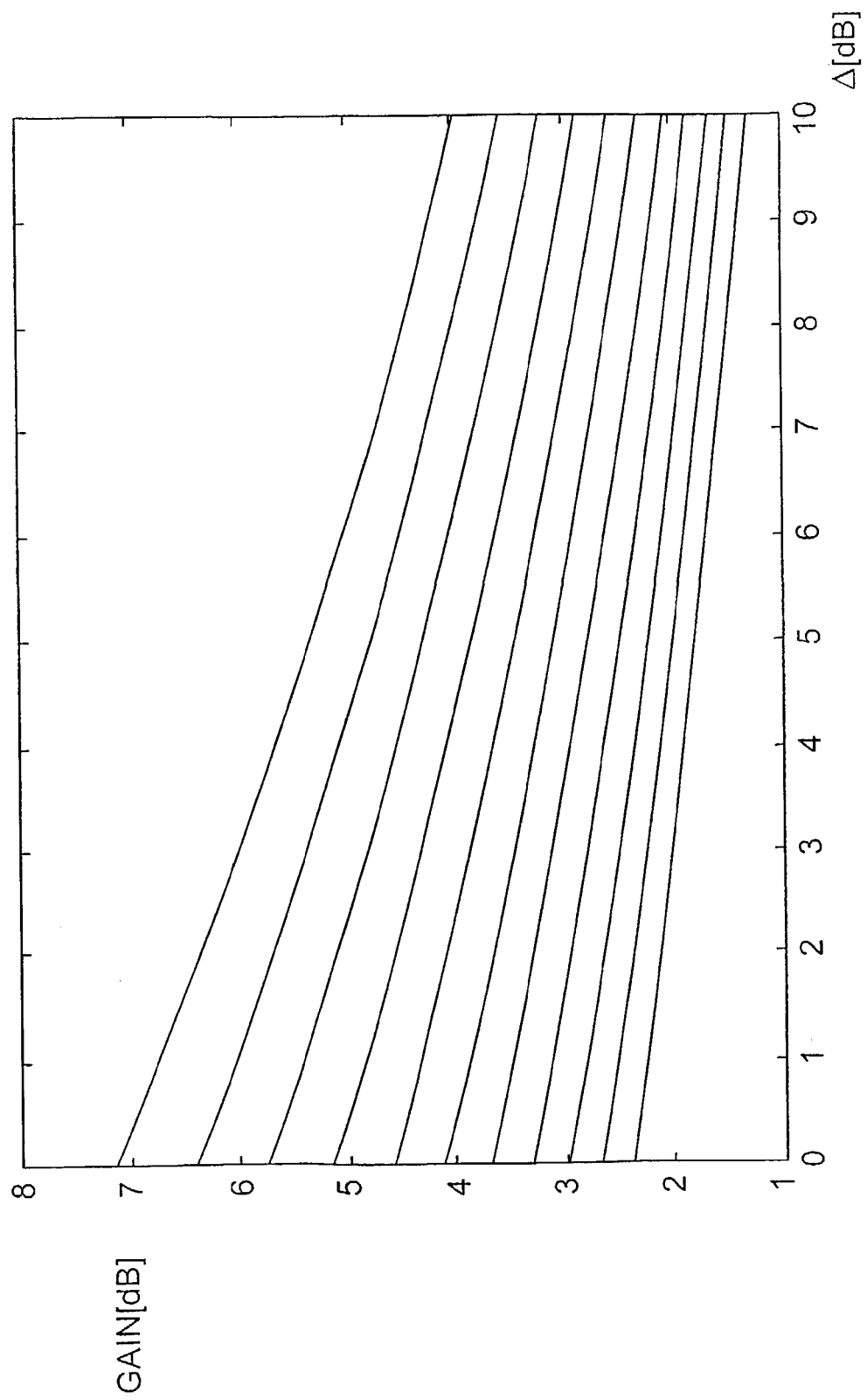
FIG. 26 illustrates the simulation results on diversity gains.

It is known that diversity reception may be implemented using either space-separated antennas (both vertically polarized) or cross-polarized (±45°) antennas. Applying maximal-ratio-combining (MRC), the resulting (scalar mean power) SNR equals the sum of the SNR's at each branch. A highest diversity gain can be achieved when the two antennas receive the same power. With cross-polarized antennas, it is possible that the input from one branch have a higher SNR while the other has a much lower SNR. For statistically fading receptions, the most important factors that determine the diversity gain are the correlation coefficient ρ and mean power difference Δ (in dB) between the two antennas. That is, the diversity gain varies with the mean power difference Δ. Since two cross-polarized antennas are located at ±45°, Δ may vary between 0 dB to 3 dB. The plot in FIG. 26 shows the effect of both Δ and ρ on diversity gain (FIG. 26 is based on the result reported in "An Experimental Evaluation of the Performance of Two-Branch Space and Polarization Diversity Schemes at 1800 MHz", authored by A. M. D. Turkmani, A. A. Arowojolu, P. A. Jefford, and C. J. Kellett, IEEE Transactions on Vehicular Technology, Vol. 44, No. 2, May 1995, pp. 318–326). In FIG. 26, the X axis represents Δ, ranging from 0 dB to 10 dB, and the Y axis represents the diversity gain. Different curves in FIG. 26 correspond to different values of ρ, ranging from 0 (corresponding to the upper most curve) to 1.0 (corresponding to the lower most curve) with step size 0.1. It is clear in the plot that the best diversity gain can be achieved when Δ=0 dB. That is when the two antennas receive the same power. This is also true even when the power on each antenna is less by 3 dB than the full power on just one of the two antennas (with nothing on the orthogonal antenna).

Figure 27:
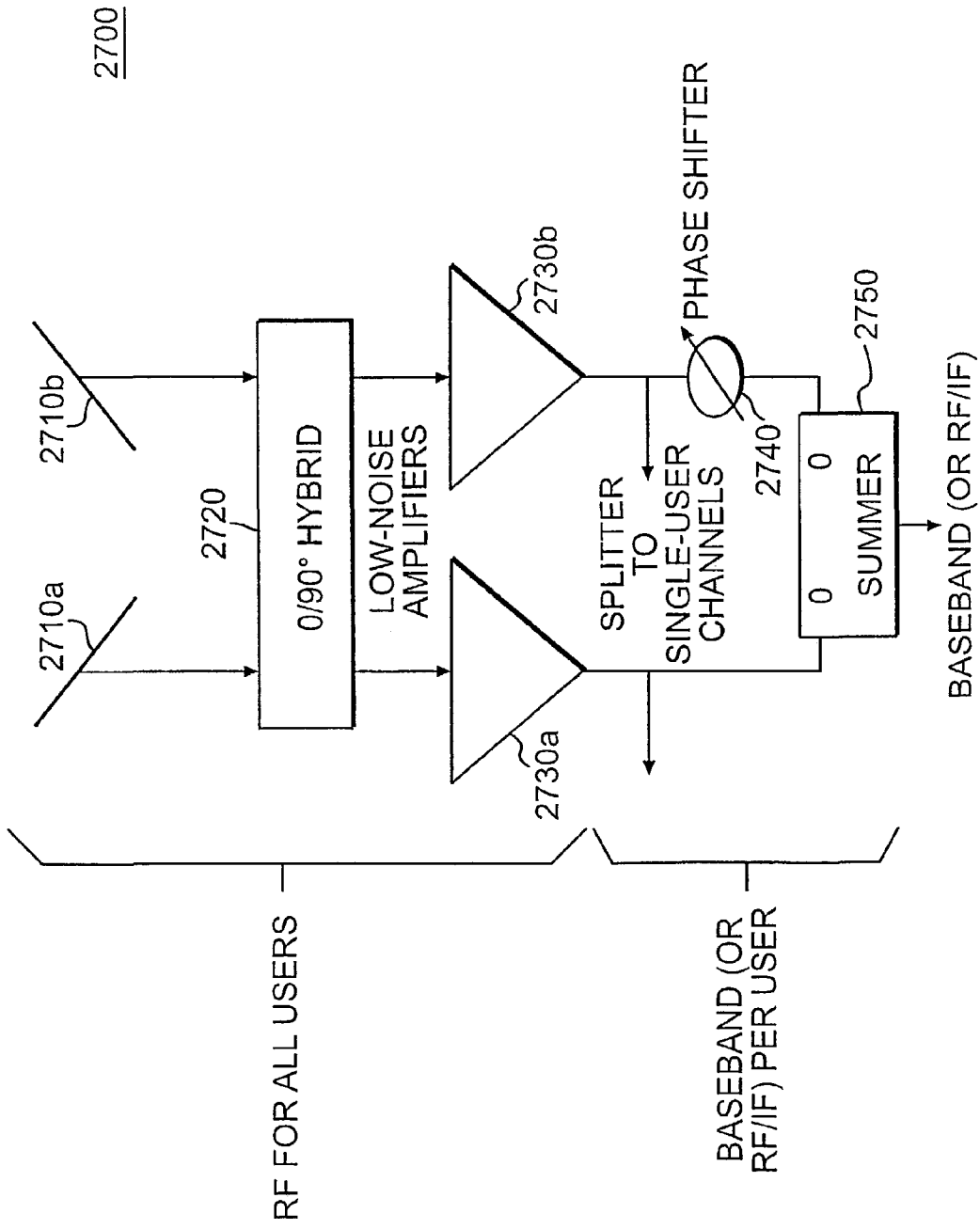
FIG. 27 is a high level diagram illustrating an embodiment of the invention.

FIG. 27 illustrates another embodiment, a polarization matching system 2700. The equal (half) power may be possibly guaranteed in the two branches with respect to any polarization orientation. This renders the MRC weight into a phase shifter, with improved relative phase estimation due to the guaranteed (3 dB less than the maximum) high SNR on both branches.

In system 2700, the outputs from the two cross-polarized antennas are fed into a 90° hybrid 2720, which produces two orthogonal outputs from circularly polarized antennas. After splitting into multiple MODEMs (one per channel/user), the MRC algorithm is operated on the two branches to yield an enhanced resultant output.

System 2800 presents another embodiment of the invention that guarantees to produce two equal power vectors from the two (generally) unequal vectors intercepted by the cross-polarized antennas. The implementation of system 2800 is similar to what is implemented for realizing polarization matching in a forward link.

Another embodiment is illustrated by system 2900. In some respects, system 2900 is similar to system 2800 except some modifications on the locations of the low-noise amplifiers. One important characteristic of system 2900 is that the entire processing network may be realized at baseband after coherent dual-channel down-conversion is performed using any diversity scheme.

Figure 30:
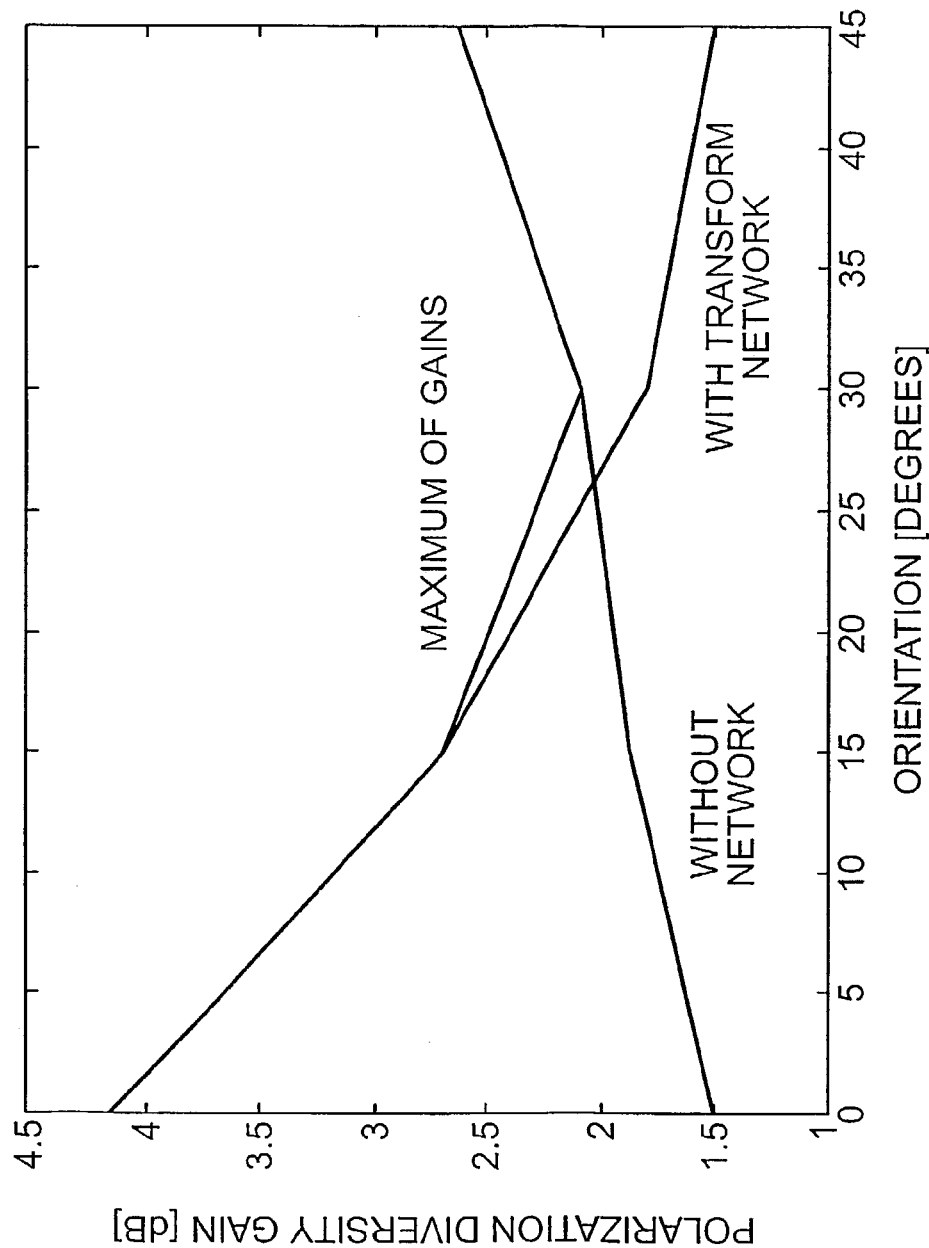
FIG. 30 illustrates the behavior of diversity gain.

The polarization diversity gain is a function of parameters Δ and ρ, as described before. In reality, since the power of the two antennas changes with to the orientation angle of the polarized wave, parameter Δ varies. In addition, the correlation ρ between the two receptions also depends on the orientation angle. Consequently, the polarization diversity gain fluctuates with the orientation angle as well. This behavior is depicted in FIG. 30 where the X axis represents the values of the orientation angle and the Y axis is the diversity gain. Two of the three curves in this figure (the ones marked as "Without Network" and "With Transform Network") illustrate the behavior. Therefore, with systems 2800 and 2900, even though Δ=0 dB is achieved, the systems may behave non-optimally compared with what is described in FIG. 26.

It is observed that for some orientation angles, system 2700 yields better polarization diversity gain than systems 1100 and 1200. But for other orientation angles, systems 2800 and 2900 yield better polarization diversity gain than system 2700. It is, therefore, desirable to form another embodiment in which two different processors (one derived from system 2700 and the other derived from 2800 or 2900) are combined at the baseband. Better linear pre-processing can be applied before the two signals are fed to the maximal-ratio-combiner (MRC). By doing so, the combined system always yields the best possible diversity gain. The curve marked as "Maximum of Gains" in FIG. 30 demonstrates such optimized behavior.

The implementation schemes presented so far may be applied to many full duplex wireless communication systems, with different multiple-access regimes, including the well known TDMA and CDMA standards. Below, the feasibility of applying the present invention to several representative standards is discussed.

According to TDMA: GSM standard, the waveforms occupy instantaneously 200 KHz in each link. The signals suffer from fading in addition to polarization mismatch losses. In a system complying with this standard, the polarization orientation does not vary significantly within a single frame. Therefore, it is possible to apply polarization matching to improve the reverse link performance at a gain of several net dBs. The BS employs one transceiver per channel (frequency), carrying 8 time division multiplexed calls, with one power amplifier per channel. It is necessary to split the low power RF into two equal power ports, to phase shift one of them, and then to power amplify using two power amplifiers each of which is rated at one half of the power of the original amplifier. After the amplification, high power 180°-hybrid plus 90° delay mechanism at the outputs of the power amplifiers can be applied to get the polarization matched transmission per active slot (per user). It is to be noted that the phase shifter at the low power RE must be set to an optimal value for each user. Therefore, it changes from slot to slot.

The implementation of system 2200 with low RF input may be used in a system that complies with TDMA: GSM standard. For a multi-carrier GSM system, each carrier should be processed separately as described above and the two outputs into the cross-polarized antennas per each carrier should be combined to yield a single multi-carrier output into each of the two cross-polarized antennas. In cases where the output from a high power 180°-hybrid plus 90° delay may be realized with enough flatness and power handling capability for the full bandwidth of the multi-carriers, it is possible to reduce the number of these networks. The reduction may be achieved by summing the outputs of the power amplifiers with respect to polarization orientations (separate the outputs destined to different polarization orientations), respectively, and then feeding the combined outputs into a single high power 180°-hybrid plus 90° delay unit.

According to standard TDMA: IS-54/136, waveforms occupy instantaneously 30 KHz in each link and signals suffer from severe fading in addition to polarization mismatch losses. Since the mean polarization orientation should not vary abruptly over 20 msec (which is the length of one time slot), it is possible to apply polarization matching to improve the reverse link performance at the level of several net dBs. The hardware realization depends on existing BS architectures. Commonly employed architectures use one transceiver per channel (frequency which carries up to 3 TDMA calls) with one Tx port and two Rx ports at low-power RF. The interface between the ports and the antennas is usually through combining networks (lossy) with, often, multi-carrier feedforward amplifiers.

To deploy polarization matching, a vertically polarized antenna may be replaced with a dual-polarized antenna. The power amplifier may be modified in such a way that the equal total power is ensured for the two antennas (one half per antenna), with two inputs and two outputs per chassis. Thus, only the amplifiers' input splitter and output combiner need to be changed. The DC supply rails are applied to each half of a number of plug-in power amplifier modules, all of which belong to the chassis. The power amplifier modules, including the number of such modules, need not be modified at all. The additional block required in the low power RF (in the Tx path) section is a non-uniform and variable power splitting network, one per frequency. Each network consists of one 1:2 power-splitter and one phase shifter per channel, two (instead of one) combining networks into the two power amplifier inputs, and one high power 180°-hybrid plus 90° delay at the outputs of the power amplifiers. This corresponds to the low-power RF implementation of system 2200, described in FIG. 22.

Current 2G CDMA systems (complying with CDMA:IS-95) employ a single modulator and up-converter that transforms the summed complex baseband signals into a single carrier transmission. To apply polarization matching, it is required to modify the baseband ASIC and to perform per user (or per active call) splitting (into 2 Tx complex baseband and phase shift one complex arm with respect to the other). In addition, the ASIC supports dual summation of the complex baseband outputs from multiple users with respect to each destined polarization (there are two orthogonal polarizations). Another modulator and up-converter unit is added to the sector equipment with common local oscillators (LO's) between the two parallel units. The two summed baseband complex outputs are then fed into two coherent modulators and up-converters. The low power dual summed RF signals are entered into a dual multi-carrier amplifier with two inputs and two outputs (could be the same multi-carrier amplifier currently deployed with a redesigned chassis to assign half of its modules to one polarization and the other half to the other polarization). The high amplifiers' power outputs are fed into a high power 180°-hybrid plus 90° delay and finally to a dual-polarized antenna. This completes the transmission chain per carrier.

The CDMA: 3G standards (WCDMA, CDMA2000) employ some new and important features in the forward link that are most relevant to the present invention. They address transmit diversity using S-T coding with two transmit antennas. Conceptually, the two transmissions are from the same information data but with related yet different coding. These two transmissions are generated and power amplified prior to being transmitted via two separated antennas that are both vertically polarized and removed horizontally from each other by 10 to 20 wavelengths. This is a form of space-diversity in Tx. The enhancement is achieved because of the coding employed. The transmissions from all the users (per approximately 4.75 MHz carrier, or 3×1.25 MHz) are summed with respect to each transmit antenna and then amplified using a linear power amplifier of the corresponding antenna.

A 3G system may benefit from polarization matching by employing it in each of the two transmit chains separately. The improvement of several net dBs in E/(I+N) may be obtained in addition to any other type of gain. To do so, the S-T coded transmission in a 3G system may co-exist with the polarization matching scheme.

Specifically, the 3G-CDMA ASIC at the BS may employ (1) polarization diversity reception (MRC) for every dual polarized antenna and (2) space diversity for every pair of space-separated dual-polarization antennas. Therefore, a total of 4 Rx diversities (2 for polarization diversity and 2 for space-separated diversity) may be employed with two intermediate combining weights (1 for each cross-polarized antenna). From the MRC of every cross-polarized antenna at the receiver end, the polarization matching Tx orientation may be estimated. During transmit, the ASIC should provide the splitting plus relative phase-shift capabilities for each user (or each active call) per output (there are 2 S-T coded outputs per user), which is similar to what is described for the IS-95 CDMA case. The 4 summed outputs (2 for every space-diversity antenna) are modulated and up-converted using 4 coherent chains (i.e. all using one common set of LO's), as opposed to 2 in the basic 3G transmit architecture.

Figure 31:
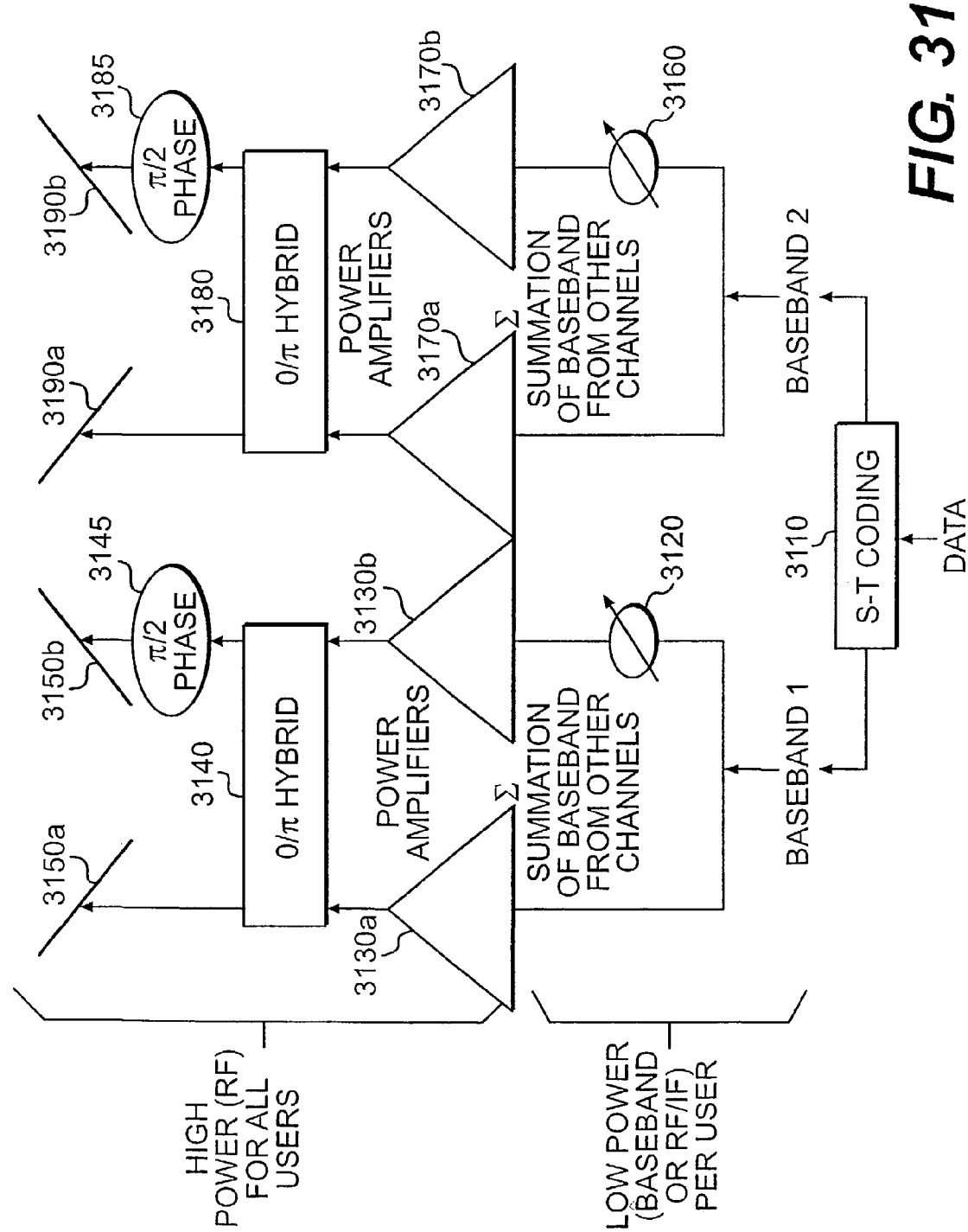
FIG. 31 is a high level diagram illustrating an embodiment of the invention.

FIG. 31 depicts system 3100, constructed and operative in accordance with another embodiment of the present invention. System 3100 provides polarization matching scheme for a 3G-CDMA implementation. As indicated in FIG. 31, system 3100 comprises four linear power amplifiers, 3130a,b and 3170a,b, to amplify the low-power RF combined signals. Each pair of power amplifiers 3130a,b, and 3170a,b is for one pair of space diversity antennas (with polarization matching), 3150a,b, and 3190a,b and will have a combined mean power rating which equals that of the (single) power amplifier per vertically polarized antenna. Finally, two pairs of high power 180°-hybrids 3140, 3180 plus 90° delays will interface the two pairs of the outputs, from power amplifier 3130a,b and 3170a,b, into the corresponding pairs of cross-polarized antennas. The power sum of the four amplifiers 3130a,b and 3170a,b is either the same as what is required in situations where just two amplifiers are employed in the basic S-T coding scheme or less, due to increased power efficiency resulted from the polarization matching implementation.

Due to various limitations, it may not be possible for some 3G sector implementations to support the space diversity configuration required for S-T coded transmission. In such situations, one option may be to deploy cross-polarized antennas in the limited space allocated. As such, the reverse link may be operated by the MODEM with polarization diversity reception, similar to that in IS-95 systems. In the forward link, however, the scheme of S-T coding with transmit diversity requires that the two paths (each with independent fading), from the antennas (BS) to the user (MS), will be of comparable mean power. Applying the polarization matching to each user will yield the estimate for the mean polarization orientation of each user. Using such estimated mean polarization orientation, the two S-T coded signals (per user) may be transmitted in the polarization orientations that are +45° and −45° off the estimated mean polarization orientation.

Figure 32:
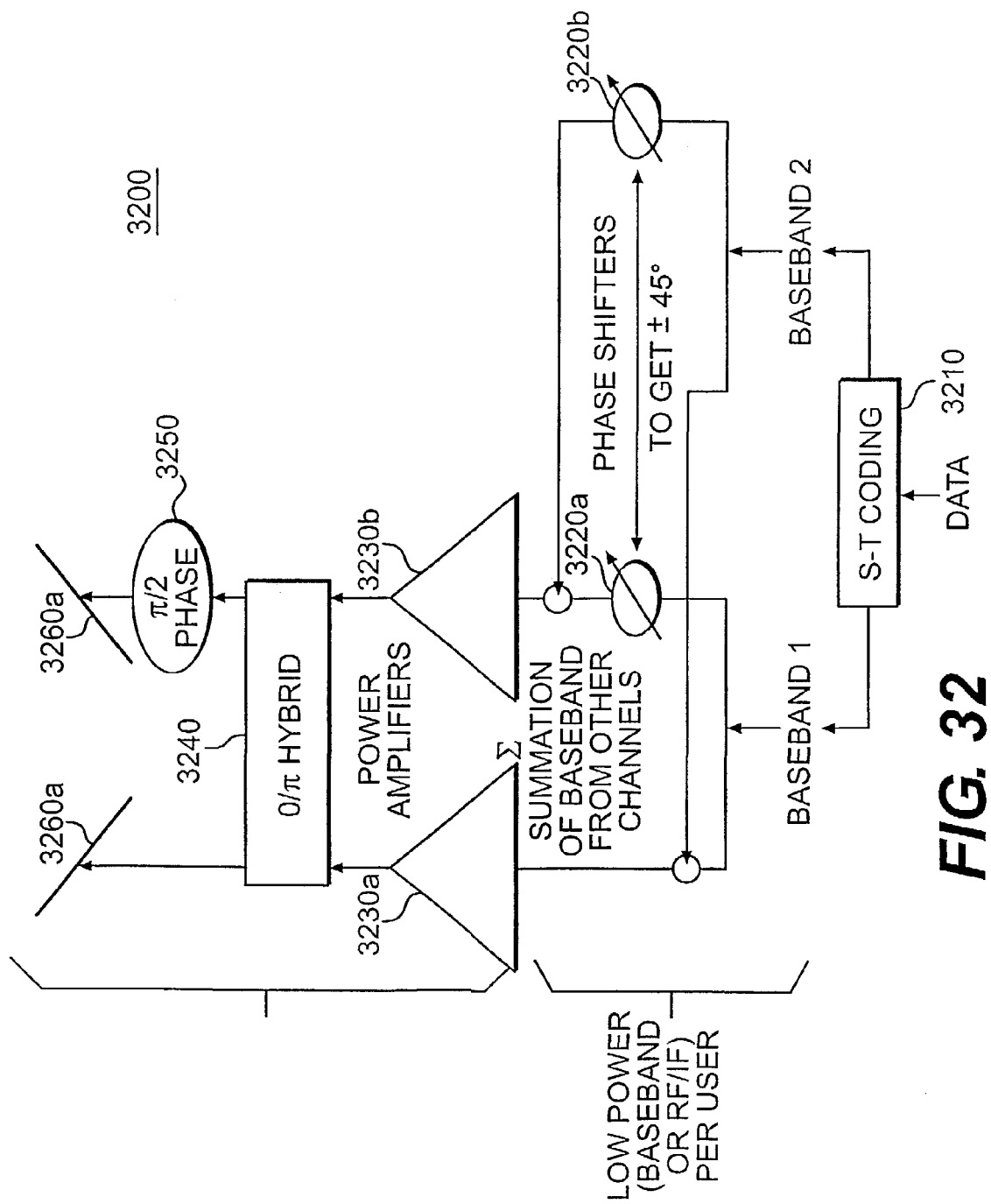
FIG. 32 is a high level diagram illustrating an embodiment of the invention.

Consistent with this notion, FIG. 32 depicts system 3200 that provides such as implementation. In system 3200, the sector transmits two signals, each attenuated by 3 dB with respect to the fully matched user polarization, but with equal mean power and independent fading, thus enabling the S-T coding to function efficiently.

Another possible alternative is to transmit the two versions of the S-T coded signals in two orthogonal circular polarizations (CW and CCW). This may be realized by using a phase shifter of less than π/2 between the 180°-hybrid and antenna in the scheme of system 1400. The same 3 dB loss will occur. Using the RAKE receiver and the S-T decoder, the user at the receive end can benefit from the diversity.

The following embodiment describes the extension of polarization matching to a multiple antenna elements case. A multiple arrangement of antenna elements is called an antenna array. When the elements are arranged in a vertical array, it is referred to as a column array. When the elements are arranged in a two-dimensional array, they are usually configured as a multi-column array. In the following discussion, the polarization matching operation in arrays is described.

The array antenna radiation pattern in receive is archived via weighting the signal at each array element (relative amplitude and phase) and combining of the weighted array element signals into the array beam output.

In transmit, the signal at the array beam port is divided into several equal outputs, each weighted (relative amplitude and phase) and fed into the transmitting elements.

Generally, applying a set of weights to an array will result in an antenna pattern, or beam, and is called beamforming. A special case of beamforming is beam steering. In the case of beam steering, the array, which generally is equispaced in the vertical dimension, and equispaced in the horizontal dimension (each possibly different from the other), forms a narrow well-defined beam pointing in a certain direction.

The relative phases along the elements in each dimension (horizontal and vertical) form an arithmetic series (vary linearly along each dimension) when the elements are uniformly spaced in each axis (vertical, horizontal). Steering the beam in each dimension requires just a single parameter per dimension in this case, the "steering angle".

When transmitting and receiving is performed with an antenna array, the polarization matching methods described above are extended into combined polarization and beam matching.

An algorithim can be applied to an antenna array in which the signal is received via the multiple-elements array, using an array of dual slanted polarization antenna elements. Upon reception, the steering angles (in azimuth and/or elevation) that result in maximum signal-to-noise power ratio are found, while the outputs of the two slant polarization arrays (e.g. +45° and −45° polarizations) are combined to achieve an output which is maximum in signal-to-noise ratio.

One such algorithm is maximal-ratio-combining (MRC), which was discussed in detail above. The relative weights of the two slant polarization arrays' outputs provide the information that determines the mean polarization of the received signal across the array.

Based on the received beam best polarization and steering angle estimation, a transmission to the same user can be performed by steering the transmit slant arrays to the same direction and orienting the transmit polarization according to the mean receive polarization as explained above.

Practically (and in general) the dual polarized antenna array characteristics will be such that it is not guaranteed that the phase centers of dual polarized antenna arrays will be co-located. For this reason, the polarization matching algorithm that was described for a single element with co-phased cross-polarized antennas may be extended into a two-dimensional array and polarization-matching algorithm.

In this extended algorithm the relative amplitudes and phases of the array elements at each polarization (of the two orthogonal polarizations) are modified in such a way that two objectives are fulfilled:

1) The effective polarization per cross-polarized element resulting from weighting the two orthogonally polarized antennas (realized in an element) upon Tx should match that same user received mean polarization.
2) The relative phases and amplitudes of the array pairs of polarization matched elements (after weighting and 2:1 combining to form one "polarization agile" element)

should be such that the overall array resulting pattern will point at that user with the maximum gain possible.

In this embodiment, polarization matching in transmit is based on the mean polarization in receive, and both polarization and array beam matching are combined for this purpose. The extended algorithm presented above can be applied to an algorithm that performs maximal-ratio-combining (MRC), whereby all complex signals into or out of the array elements undergo complex weighting to achieve the best signal-to-noise power ratio. The MRC algorithm was described in greater detail above.

The method presented above in the case of the general dual-polarized array can also be described as forming in transmit, both in the polarization and array pattern spaces, a retro-directive beam, based on the mean receive optimum polarization, and employing array beamforming matched to the specific user transmission.

In addition to the general case presented above, it is important to note several special cases, where the array has a well-controlled phase-center matching for the two orthogonal polarizations.

For a single column array the beam steering is performed only in elevation, this is called tilting the beam. Thus, we have in this case joint polarization matching and beam tilting. For a multi-column array, both tilting and azimuthal steering are applied for each of the two slant-polarization arrays, accompanied by polarization matching.

One implementation of receive array beam steering and polarization matching is via sequential/staged optimization: first, beam steering is performed on each of the two slant arrays, followed by combining for matched polarization reception.

Another implementation is to optimally weight 2N-element array, where N elements are in one polarization, and the other N elements are in the other (orthogonal) polarization.

If the 2N-complex vector of signal envelopes received at the array elements is denoted by S, then the optimum weight will be:

$$W = \frac{S^*}{|S|}$$

Where the asterisk denotes a complex conjugate, and the vector W is normalized. It is assumed in the equation above that all elements have additive noises, which are normal zero mean and i.i.d. (i.e., independent identically distributed).

The orthogonality of the two polarizations leads to the conclusion that the entries of the vector S can be arranged in such a way that it can be expressed as:

$$S = \begin{bmatrix} S_1 \\ S_2 \end{bmatrix}$$

where $S_1$ and $S_2$ and n-dimensional vectors each, corresponding to the two polarization-arrays. The weight vector can be expressed as corresponding weights per each array:

$$W = \frac{\begin{bmatrix} S_1^* \\ S_2^* \end{bmatrix}}{|S|} = \frac{\begin{bmatrix} S_1^* \\ S_2^* \end{bmatrix}}{\sqrt{|S_1|^2 + |S_2|^2}} = \begin{bmatrix} W_1 \\ W_2 \end{bmatrix}$$

It can be shown that this set of weights performs both beam steering and polarization matching as described above.

The viability of polarization matching of the above embodiments were confirmed during field trials which are described below. In particular, the field trials confirmed the correlation between the polarization vectors of the forward and reverse links. The trial included the following:

Transmission of both links from the MS, and reception at the BTS. This simplifies the test equipment and procedures considerably. The results are valid, by recognizing that the channel is reciprocal for any given frequency.

The transmit antenna—a linear dipole, is rotated in the vertical plane, thus providing a periodically variable polarization for both frequencies.

A linearly polarized receive antenna at the BTS receives signals that fluctuate periodically in time.

The cross polarization discrimination (XPD) is measured from these fluctuations.

The correlation between the average polarization vectors (the polarization ellipse) of the two frequencies is then measured.

The multipath fading is measured for a non-rotating transmit antenna, and the correlation between the fading in the two frequencies evaluated.

The trials were conducted at PCS frequencies, LOS and NLOS, Rural and Sub-Urban, and at varying speeds (0 to 70 Km/hr). As part of the tests, a mobile transmitter station and a stationary receive station were used. The tests confirm polarization matching between the frequency-separated transmissions, both for LOS and for highly cluttered NLOS channels.

The test transmitted over a wireless mobile channel varying polarizations, at two distinct frequencies, in order to simulate the up-link to down-link FDM separation. Because of the reciprocal nature (with respect to the channel) of the long-term average polarization, the transmit was performed from one site and the receive from another. In particular, the mobile site was chosen as the transmitting site, while the receiving site was stationary.

The two PCS continuous-wave (CW) sources, which represented the up-link and down-link frequencies, were transmitted through a linearly polarized antenna. The rotation of the antenna in the vertical plane causes a varying transmit polarization. Thus, scanning all polarizations (vertical to horizontal) enables the evaluation of the channel XPD at both frequencies upon reception by a linearly polarized antenna, as well as to compare the relative reception of the two frequencies over time. Polarization matching exists if highly correlated average power is received at the two distinct frequencies.

The range of the test area was between 2–5 Km, and in rural and sub-urban environments, both LOS and NLOS.

In the trial system, the transmitter used two PCS CW synthesized sources, at frequencies 1875 MHz and 1975 MHz. The combined synthesizer's outputs were power amplified into 20 dBm total mean power in two sets of tests, and into 33 dBm total mean power in the third set of tests. The higher power was made available for the NLOS tests in a sub-urban environment. The transmitter antenna was a dipole with better than 20 dB XPD. The whole transmitter assembly, including battery power sources were mounted on (and behind) a circular rotating plate that served as a (parallel) back plane for the transmitting dipole. The dipole was mounted at the center of the plate, and transmitted to a hemisphere. The transmitter equipment was mounted on top of a roof of a vehicle, and transmission was towards the rear hemisphere of the vehicle. The rotation caused the transmitted signals to attain all linear polarizations in the plane of rotation, simultaneously, through the same antennas and into the same channel. In addition, the equipment mounted on the vehicle was tested at a stationary position prior to a run of tests, to confirm the overall operation of the trial set-up. The stationary receive equipment was placed at the antenna range control room and the linearly polarized receive antenna could be rotated both in azimuth and polarization.

Figure 8:
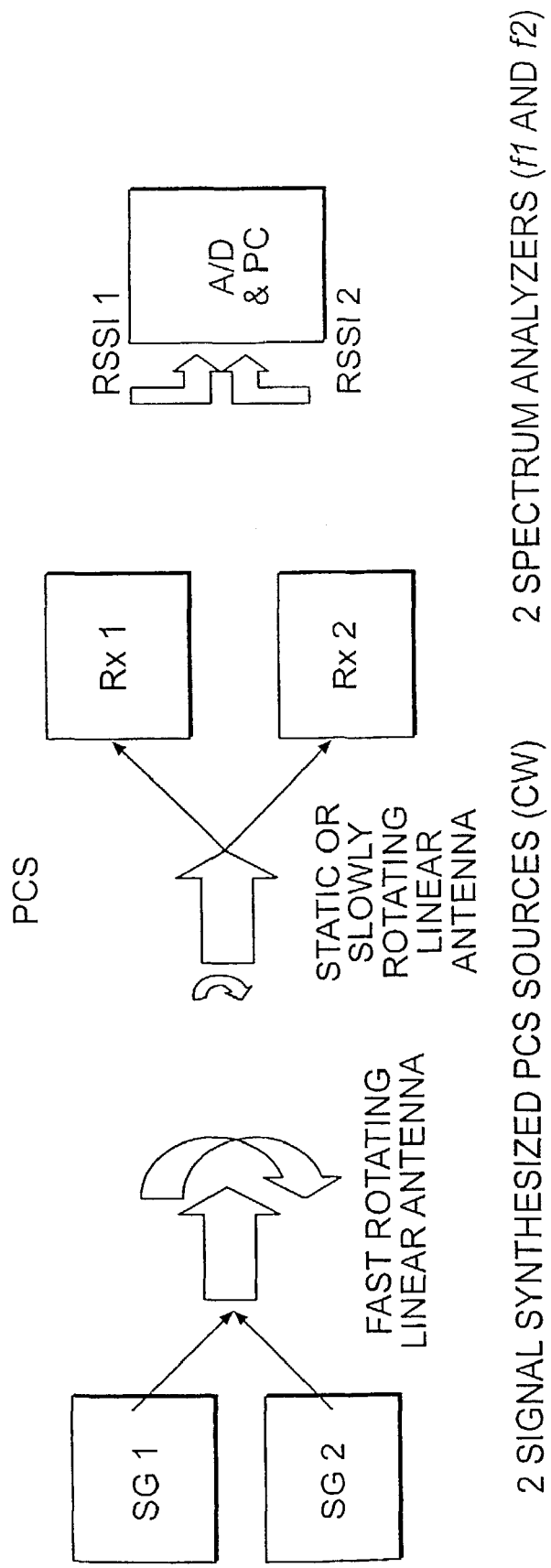
FIG. 8 is a high level diagram depicting a trial system.

FIG. 8 illustrates the test system layout for the trial tests. The linearly polarized antenna received the transmissions with a "full rectified" shaped detector (mean-power) waveforms, reflecting the polarization projection onto the receiving antenna according to:

$$\Delta Power = 20 \cdot \log_{10}(abs(\cos \Theta)), \; [dBm]$$

At a rotation rate of 30 rpm there is one polarization "cycle" (from fully aligned to orthogonal) per second.

The receiving system comprised a linearly polarized patch antenna followed by an LNA and split into two spectrum analyzers that served as selective receivers. The spectrum analyzers were operated in zero span mode, with 10 KHz resolution bandwidth, 3 KHz video bandwidth, sweep rates variable from 100 milliseconds/screen to 20 seconds/screen. The spectrum analyzers were operated under HPIB control that synchronized the sweep starts of the two spectrum analyzers, and the screen downloads into the PC (with 401 samples per screen per spectrum analyzer down loaded).

The technical specifications of the trial equipment were as follows:

Antennas
1 Tx Antenna: Dipole on a backscreen, Linear Polarization, XPD>20 dB
1 Rx Antenna: Huber-Zunner Patch, Linear Polarization, XPD>25 dB Tx Polarization Rotation
Dipole rotated in vertical plane
Rate—One (1) rotation per 2 sec. (30 rpm)

Frequencies
1× Carrier at 1875 MHz
1× Carrier at 1975 MHz

RF Power
Tx Power—20 dBm, or 33 dBm total mean Tx power into antenna

DC Power
1×12V/60 Ah Battery for assembly rotation
1× or 2×12V/7 Ah Batteries for RF transmitter Vehicle Mounting
Roof-top, wooden mounting floor
Plastic wind-shield (over a wooden enforcing structure)
Rotation on-off switch (from Battery) near the Driver Receiving Equipment
LNA+2:1 power splitter
2× Spectrum Analyzers (S/A operated under HPIB at Zero Span, with Synchronized Sweep Start, and Synchronized Sweep Download into PC)
1× Oscilloscope, dual channel (to present S/A Aux. Video outputs).
1× PC
HPIB Cables, RF Cables, DC Cables Communication
2× Cellular Phones This first set of the trial had the following specific objectives:
1. Generally confirm the Polarization Matching Phenomenon.
2. Check and evaluate Correlation between Linear Polarizations (Projections upon reception on a Linear Test Antenna) of waveforms power (long-term average) at two distinct frequency bands over same Wireless Mobile Channel.
3. Test at PCS frequencies with realistic frequency separation, both LOS and NLOS, Rural and Sub-Urban, and under Varying Speeds (0 to 70 Km/Hour).
4. Confirm Sizeable XPD's of Received Signals in various scenarios.
5. Quantify the Power Value of Matched Averaged Polarization, as function of Scenario.

In addition, confirmation was made of well-known phenomena, such as correlated (long-term) behavior of path-loss (including shadowing), with uncorrelated fast fading between the two signals, separated in frequency by 100 MHz.

The tested and/or controlled parameters relevant to the trial were as follows:
XPD of Test Antennas (was measured);
XPD of wireless channel (LOS, NLOS, rural, sub-urban);
Polarization Matching between two distinct frequencies (correlation);
Fading of each signal, and their lack of correlation;
Mobile speed, environment; and
Reference fixed polarization measurements.

Figure 9:
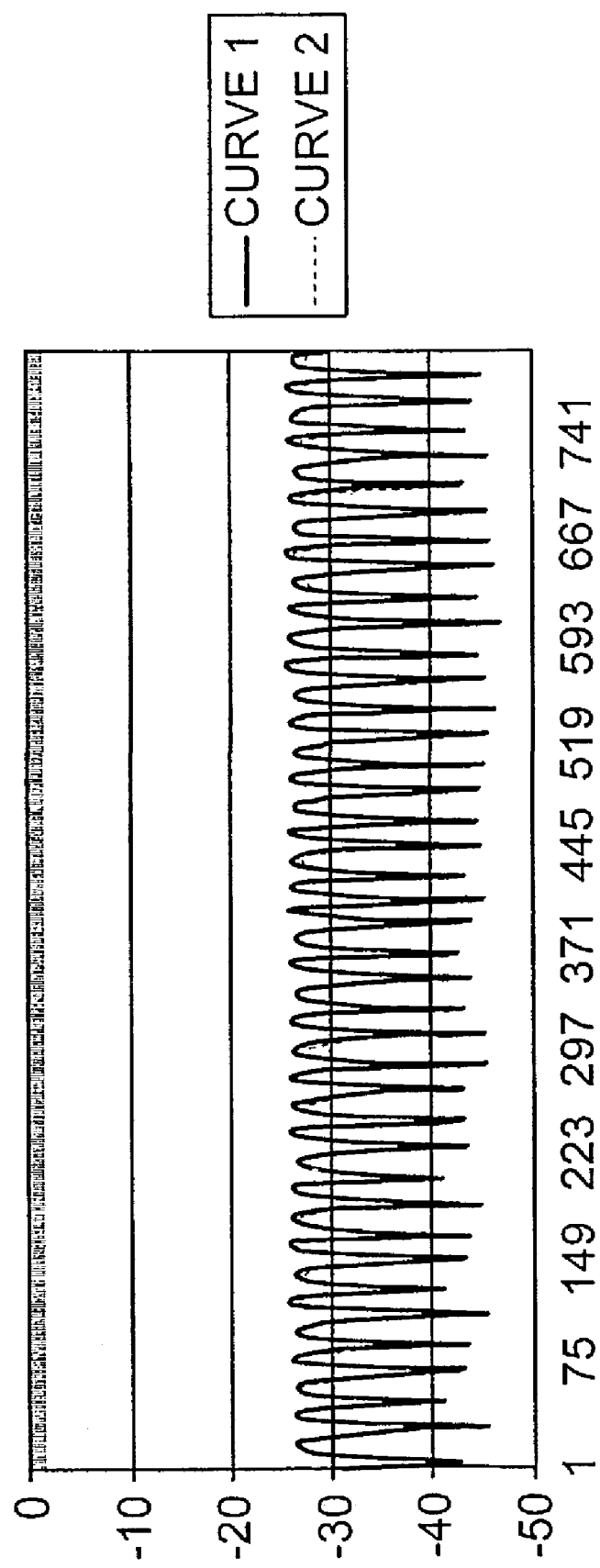
FIGS. 9–12 depict graphs of a plurality of trial tests.

In the trial results, the two graphs represent the received signals of two distinct frequencies, over time measured in a number of samples. The pre-tests were run after the installation of the equipment on the vehicle, and setting up the trial system. The measurements were taken while the vehicle was stationary at approximately 50 meters from the Rx antenna. FIG. 9 shows the effect of the rotating polarization, and the tracking of both signals. It also shows that an overall XPD larger than 15 dB is exercised by the trial equipment.

Figure 10:
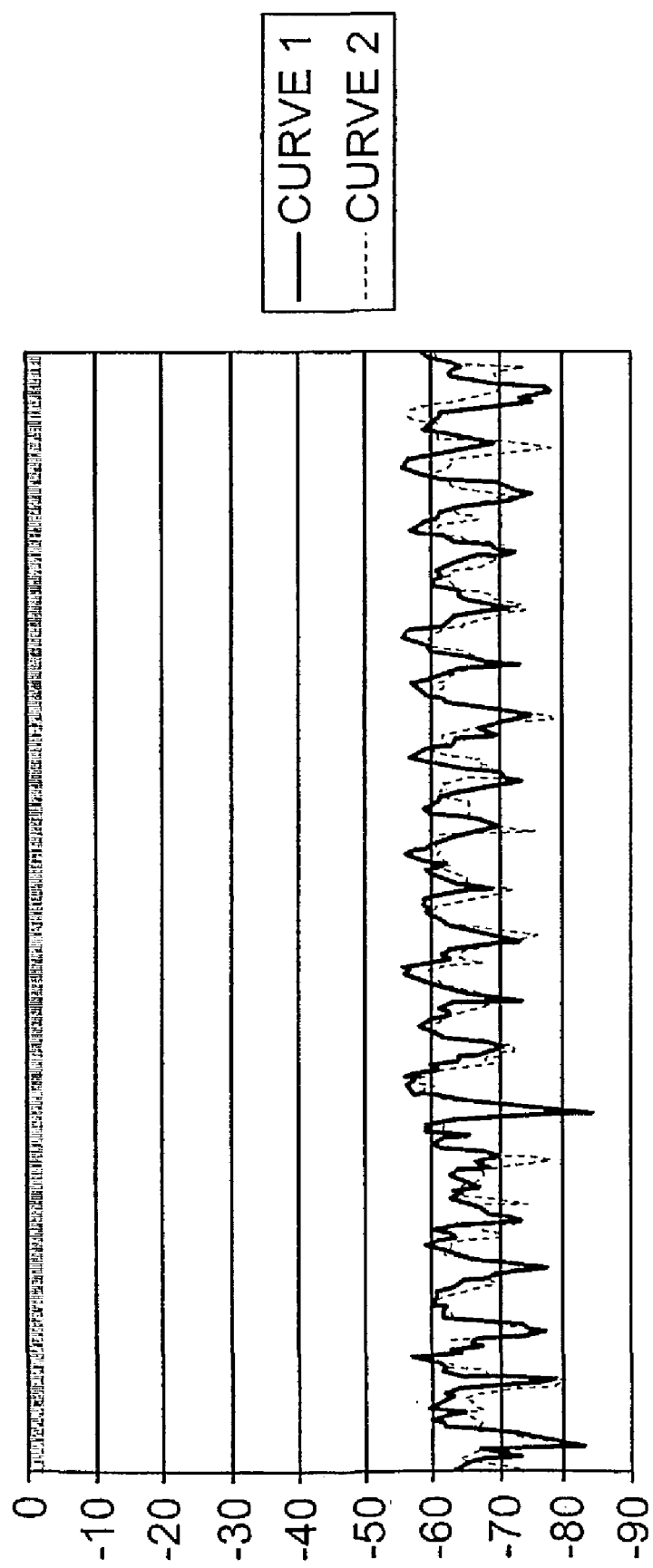

The test drives were run at various speeds, with fixed (vertical and slanted) and rotating polarizations. The route was mostly LOS with some NLOS sections. FIG. 10 shows the rotating polarization of the transmit antenna, and the excellent tracking of the signals at two different frequencies upon reception. Although occasional reflections cause some fades, the channel does not suffer from heavy multipath. The XPD preserved along this channel is at least 10–11 dB.

Figure 11:
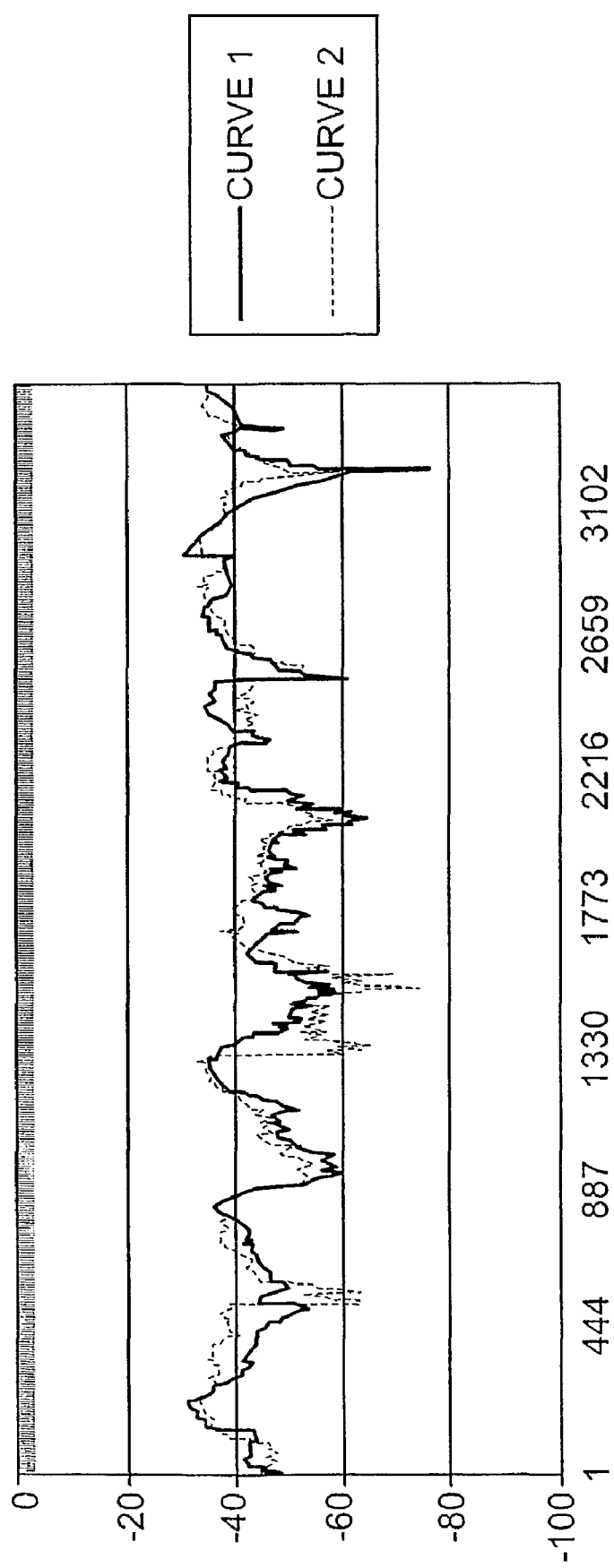

The suburban drive routes enabled testing with varying degrees of reflections and multipath. In the LOS suburb, the route was up-hill with buildings, which causes background clutter, as shown in FIG. 11. FIG. 11 shows the rotating polarization of the transmit antenna, and the excellent tracking of the signals at two different frequencies upon reception. Although occasional reflections cause some fades, the channel does not suffer from heavy multipath. The XPD preserved along this channel is at least 10–11 dB.

Figure 12:
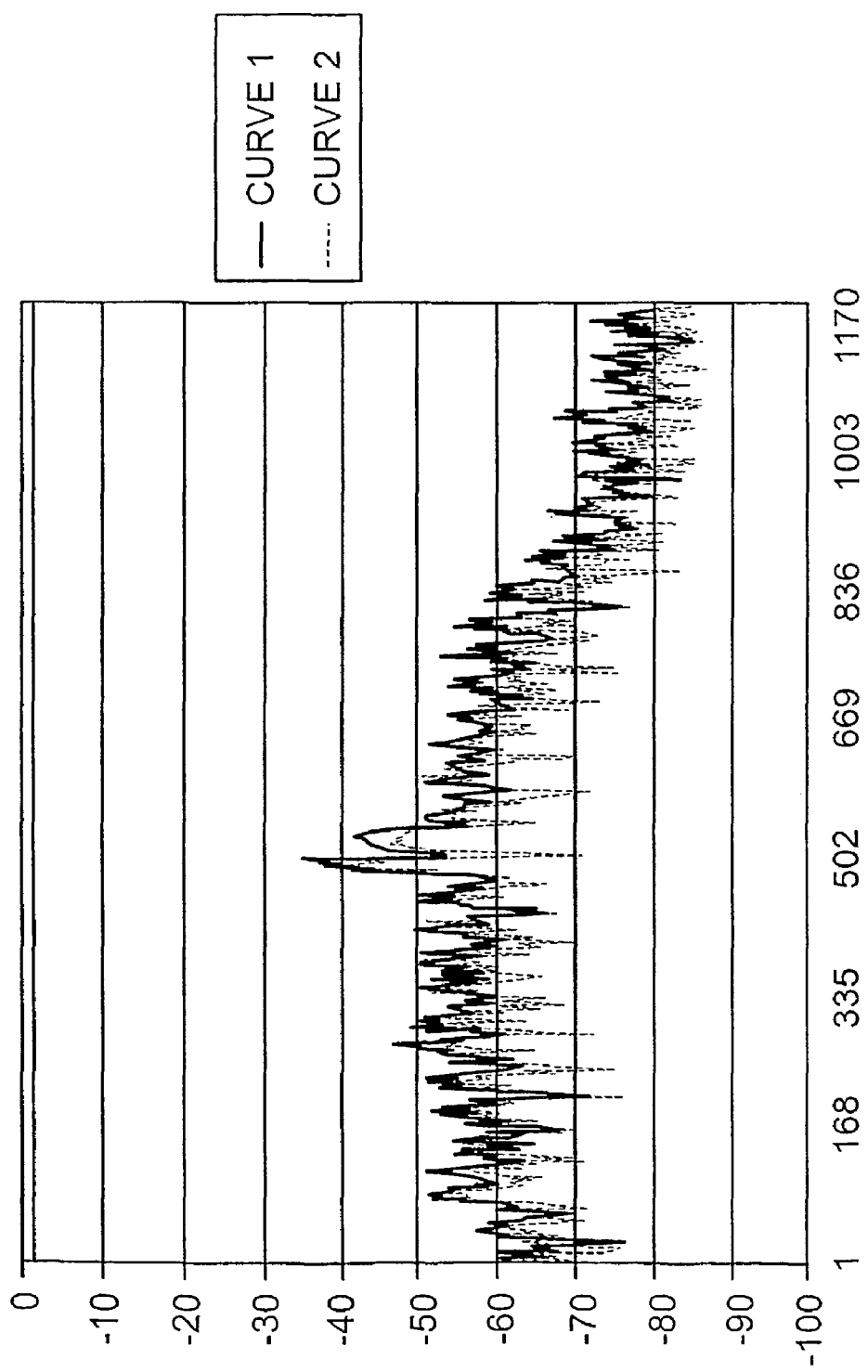

In the NLOS suburb, the route was chosen such that the vehicle was completely at NLOS with respect to the antenna range, and surrounded mostly by buildings. The received signals suffered a highly reflective environment, resulting in increased fading. FIG. 12 illustrates that in this area the channel is generally NLOS with a narrow "window."

Fading is exercised (independent on the two signals) with XPD of (at least) 10 dB, and a remarkable pattern of the rotating polarization. Again, the two signals track (long-term) each other in accordance with the polarization matching.

The trial results clearly demonstrate that in rural, sub-urban, LOS and NLOS channel cases, an XPD of at least 10 db, following the $\cos^2(\theta)$ law will occur. In other words, polarization mismatch will result in a significant power loss. The tests also demonstrate the benefit of transmitting at the correct polarization for each user.

Second, the trial results clearly demonstrated high correlation between the received signal levels for the two signals (representing the up- and down-link transmissions). Calculated correlation coefficients of 90% and above resulted for the long-term raw data (non-smoothed). This indicates that polarization matching exists, for all channels tested in the trials.

Overall, these results indicate the existence of the polarization matching, and sets the basis for its implementation in wireless mobile communication systems.

Based on the XPD and polarization matching trial results summarized above, it is expected that the following power values (with respect to a vertical polarization transmitter site) may result from applying the polarization matching algorithms in the down- (forward-) link of cellular/PCS site equipment: Forward-link gain of 3–5 dB (average), and over 9 dB recovery from "coverage holes" (i.e., −polarization mismatch). This stems from an average polarization mismatch of 7 dB (and maximum of 9 dB) that is estimated to be the situation of 95% of the users in a typical cellular sector, with some implementation losses. This improvement is decoupled from fading, which exists in a polarization mismatched system, and will continue to exist in a polarization matched system. The fading observed all along the Trial runs followed its well-known behavior, including dependence on the radial vehicle speed, and independence between the two-frequency separated signals.

The trials provide conclusive results of the existence of polarization matching between two transmissions over the same channel and separated in frequency by at least as much as is common for FDM Cellular/PCS wireless systems. Other systems, e.g. iDEN, TETRA, etc. may also benefit from application of the polarization matching technology. Additionally, the results demonstrate that the XPD is at least 10 dB over LOS and NLOS rural and sub-urban channels, thus justifying the implementation of polarization matching algorithms with dual-polarization transmitters in various wireless mobile communication systems, such as in Cellular/PCS base-station equipment.

In cellular systems, the data required to detect and determine the received signal polarization may be embedded within the Rx MODEM processing, as illustrated above. To use this data requires an interface with the Rx MODEM, on per-user basis. Because this interface is not always available, another embodiment enables estimation of the received polarization for TDMA system without an interface with the Rx MODEM. The embodiment may use a timing signal, which signifies the timing of the serviced user. This timing signal may be used for the Transmit polarization matching operation.

Figure 13:
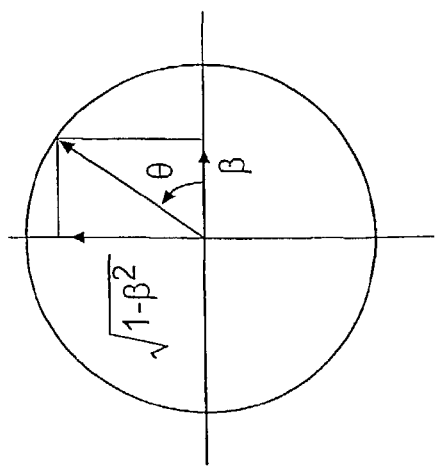
FIG. 13 illustrates a received vector representing a RF signal polarized in a direction θ.

FIG. 13 illustrates a received vector representing RF signal polarized in direction θ. It may be assumed that the RF signal level is normalized and equal to 1. If the horizontal component is $\beta$, then the vertical component is $\sqrt{1-\beta^2}$. The embodiment estimates the long-term (averaged over many TDMA time slots) polarization direction (i.e., a long-term estimate of β, including sign).

The output from each antenna may be transferred to a LNA and RF filter. Then, input to a Σ-Δ RF combiner that will produce dual outputs that are proportional to the sum of the two inputs and to the difference between them. Thus, considering the signal amplitude at each port, and assuming that the overall system gain is still unity, the outputs are:

$$\Sigma = \beta + \sqrt{1-\beta^2}$$

$$\Delta = \beta - \sqrt{1-\beta^2}$$

Figure 14:
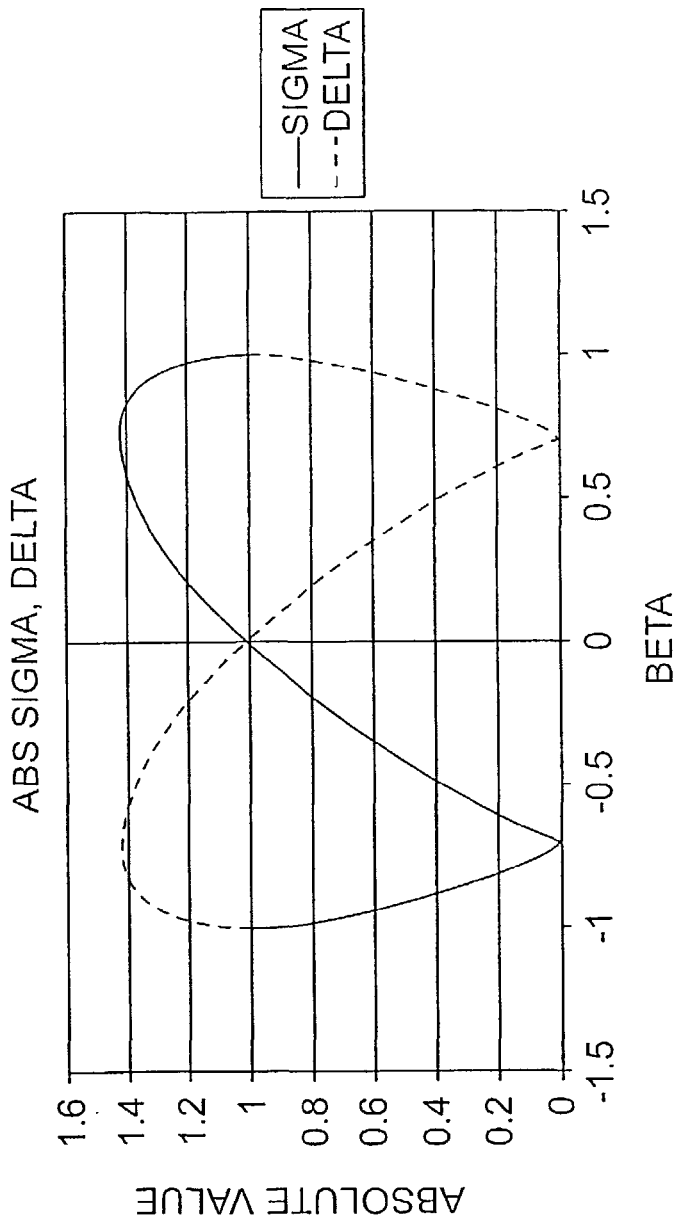
FIG. 14 is a graph that illustrates the dependence of ABS (Σ) and ABS (Δ) versus β.

FIG. 14 illustrates a graph of the absolute value (i.e., an envelope detector) for each output. The graph shows the dependence of ABS (Σ) and ABS (Δ) versus β.

Figure 15:
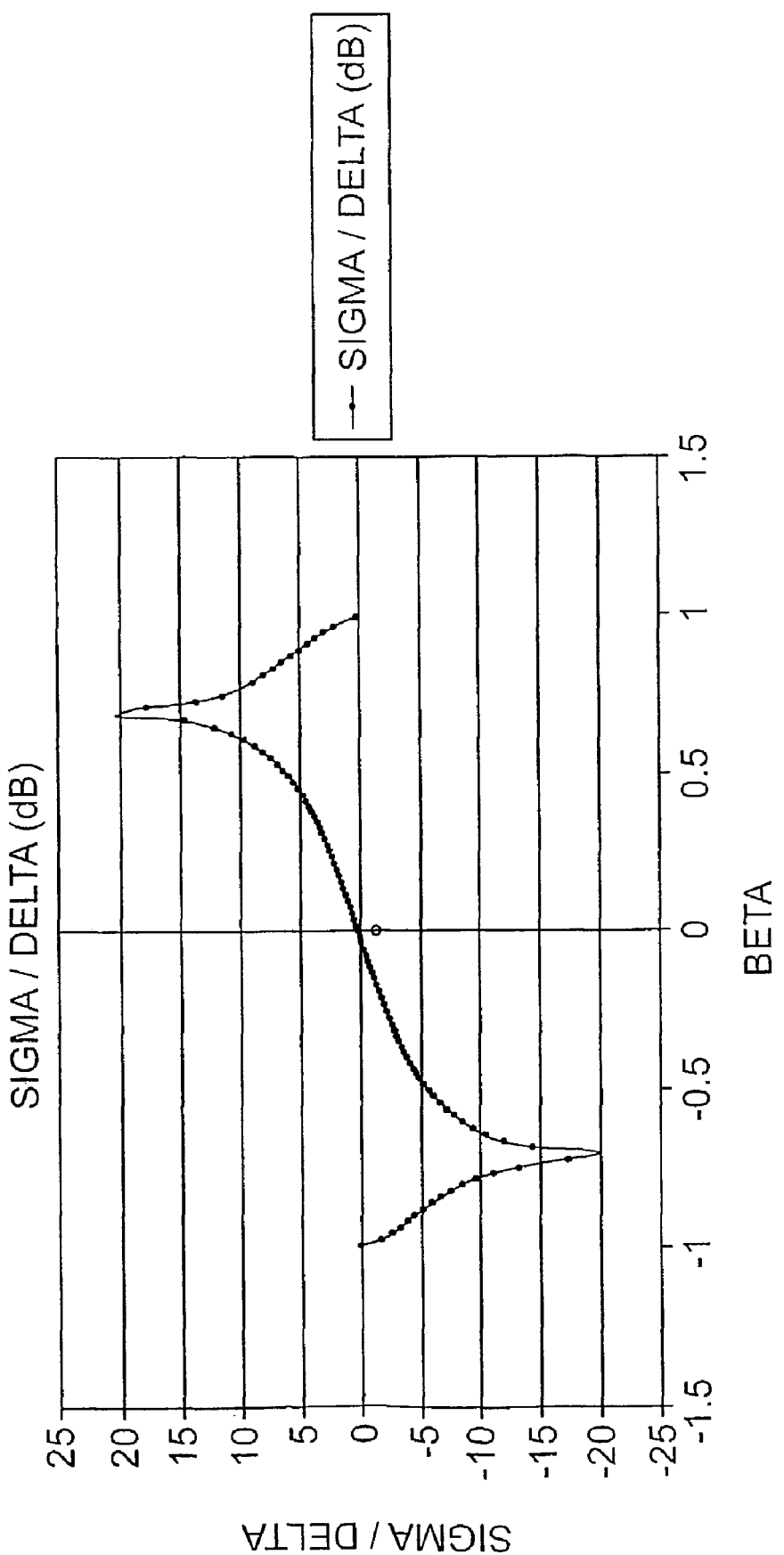
FIG. 15 is a graph of the log ratio Σ/Δ.

FIG. 15 illustrates the log ratio Σ/Δ that provides information about β, such as the sign of β. However, it is non-linear in β and, moreover, it does not provide one-to-one dependency.

Figure 16:
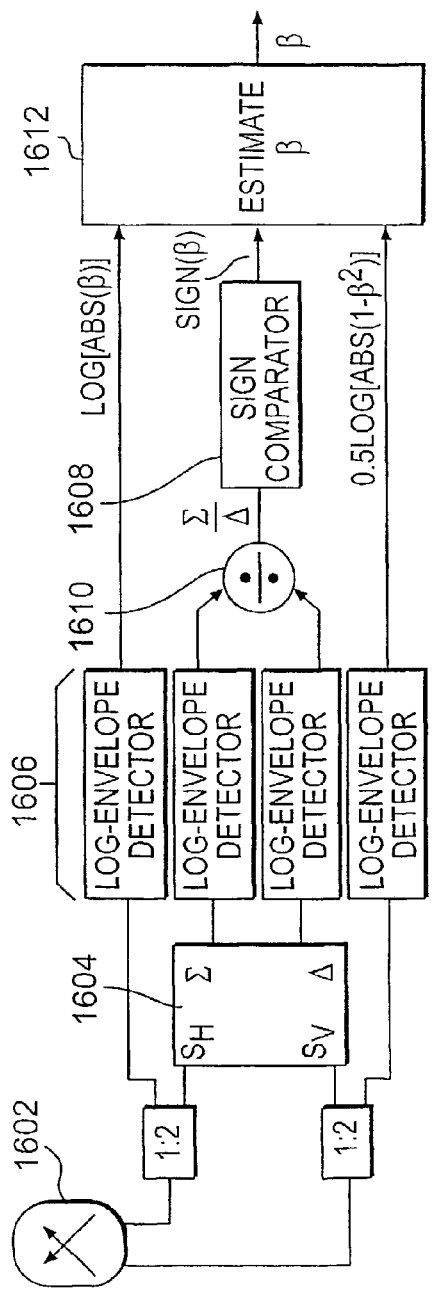
FIG. 16 is a high level diagram depicting an embodiment of β estimation.

In FIG. 16, the logarithmic representation of Σ/Δ provides information about the sign of the polarization vector (quadrant selection); however, it is not one-to-one dependent on β, and it is highly non-linear. Thus, the absolute value (i.e., envelope detection) of the original signals is taken. The measurement is linearly dependent on β, but loses the sign (since the envelope of the signal is measured). When combining the results from the Σ/Δ measurement, an estimate for β, and quadrant identification can be found. FIG. 16 is a block diagram is an embodiment in which β is estimated.

Figure 17:
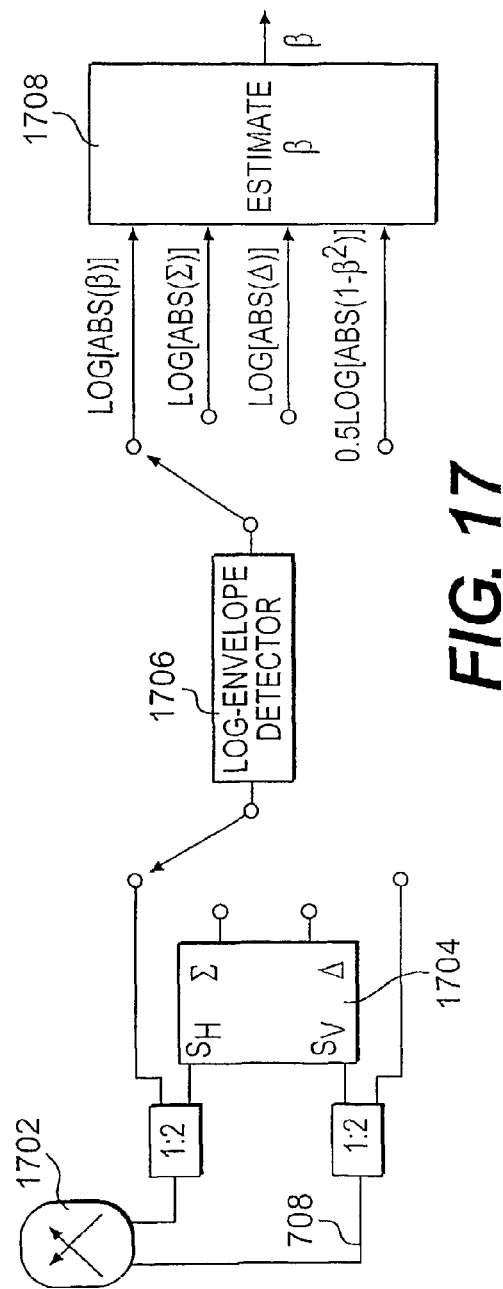
FIG. 17 is a high level diagram depicting another embodiment of β estimation.

It should be noted that β changes slowly with time. Thus, it is possible to implement the same principle utilizing only one receiver and switching between signals, for example, with two SP4T switches. In this embodiment, the processor (i.e., digital signal processor) processes the output of the output switch, as shown in FIG. 17.

For forward links, polarization matching techniques are developed in embodiments of this invention that make BSs capable of transmitting signals that match the polarization state of a mobile station during BS-to-MS transmission.

While the invention has been described with reference to the certain illustrated embodiments, the words which have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed:

1. A method of controlling a plurality of beam patterns radiated by a base station in a wireless communication system, comprising:
   receiving at least one signal from a mobile station at the base station;
   determining estimated attributes of said at least one signal received by the base station;
   calculating smoothed versions of said estimated attributes according to a predetermined set of criteria;

generating a set of weighted signal parameters according to said smoothed versions to describe a polarization state of said at least one signal; and applying said weighted signal parameters to modify a signal transmitted by said base station such that said transmitted signal substantially matches said polarization state of said at least one signal.

2. The method of claim 1, further comprising setting a default polarization state of transmit elements in the base station.

3. The method of claim 2, wherein said default polarization state is vertical.

4. The method of claim 1, wherein the base station is configured for a TDMA wireless communication system and said weighted signal parameters are applied digitally at a baseband frequency of said CDMA wireless communication system.

5. The method of claim 1, wherein the base station is configured for CDMA wireless communication system and said weighted signal parameters are applied digitally at a baseband frequency of said CDMA wireless communication system.

6. The method of claim 1, wherein said estimated attributes include at least amplitude and phase information of said at least one signal.

7. The method of claim 1, wherein said determining is performed by a microprocessor.

8. An apparatus, in a wireless communication system, for controlling a plurality of beam patterns radiated by a base station to match the polarization of beam patterns radiated by at least one mobile station, comprising:

an attribute estimation unit configured to process at least one signal received by the bas station and to determine estimated attributes of said at least one signal;

a data smoothing mechanism coupled to said attribute estimation unit, said data smoothing mechanism configured to calculate smoothed versions of said estimated attributes in accordance with a predetermined set of criteria; and a normalized weight generator to generate weighted signal parameters according to the smoothed versions, the weighted signal parameters being applied to said at least one signal to achieve polarization matching.

9. The apparatus according to claim 8, wherein said attribute estimation unit produces a set of estimated attributes, including at least an amplitude and phase value of said at least one signal.

10. The apparatus according to claim 8, further comprising:

a quadrant detector configured to determine a sign of said phase value; and a filtering unit configured to filter out short term variations in said at least one signal based on said estimated attributes;

wherein said normalized weight generator is coupled to said quadrant detector and said filtering unit.

* * * * *